(12) United States Patent
Webber et al.

(10) Patent No.: US 12,548,097 B2
(45) Date of Patent: Feb. 10, 2026

(54) SYSTEM AND METHOD FOR ADVANCED MISSION PLANNING

(71) Applicant: Odyssey Systems Consulting Group, Ltd., Wakefield, MA (US)

(72) Inventors: Reid Webber, Sarasota, FL (US); Stephen St. Mary, Medfield, MA (US); Andrew Kennedy, Holliston, MA (US); Alessandro Agnello, Peabody, MA (US)

(73) Assignee: Odyssey Systems Consulting Group, Ltd., Wakefield, MA (US)

( * ) Notice: Subject to any disclaimer, the term of this patent is extended or adjusted under 35 U.S.C. 154(b) by 481 days.

(21) Appl. No.: 17/819,712

(22) Filed: Aug. 15, 2022

(65) Prior Publication Data

US 2023/0056136 A1 Feb. 23, 2023

Related U.S. Application Data

(60) Provisional application No. 63/234,009, filed on Aug. 17, 2021.

(51) Int. Cl.
*G06Q 50/26* (2024.01)
*G06Q 10/10* (2023.01)

(52) U.S. Cl.
CPC .......... *G06Q 50/26* (2013.01); *G06Q 10/103* (2013.01)

(58) Field of Classification Search
CPC ............................. G06Q 50/26; G06Q 10/103
See application file for complete search history.

(56) References Cited

U.S. PATENT DOCUMENTS

| | | | |
|---|---|---|---|
| 10,176,171 B1* | 1/2019 | Patterson | G06F 40/58 |
| 10,587,335 B1* | 3/2020 | Choi | H04B 7/18513 |
| 11,669,512 B1* | 6/2023 | Smith | G06Q 50/26 |
| | | | 707/690 |
| 2008/0311894 A1* | 12/2008 | Klein | H04L 41/22 |
| | | | 455/414.2 |
| 2010/0274620 A1* | 10/2010 | Upadhyaya | G06Q 10/06398 |
| | | | 705/7.42 |
| 2013/0232539 A1* | 9/2013 | Polunin | G06Q 10/105 |
| | | | 726/1 |
| 2016/0364271 A1* | 12/2016 | Burger | G06F 9/5044 |
| 2019/0354771 A1* | 11/2019 | Kleinrock | G06F 16/909 |

(Continued)

OTHER PUBLICATIONS https://defenseinnovationmarketplace.dtic.mil/wp-content/uploads/2018/02/CJCS_ISRJointForce2020WhitePaper.pdf, Intelligence, Surveillance, and Reconnaissance Joint Force 2020 White Paper, 2014, pp. 1-14.

(Continued)

*Primary Examiner* — Andrew B Whitaker
*Assistant Examiner* — Shaun D Sensenig
(74) *Attorney, Agent, or Firm* — HUNTON ANDREWS KURTH LLP

(57) ABSTRACT

Exemplary embodiments generally relate to systems and methods that provide for a real-time, globally federated collaboration environment to support normalized Intelligence, Surveillance, and Reconnaissance Processing, Exploitation, and Dissemination planning, scheduling and reporting. Specifically, exemplary embodiments provide an open software architecture that allows for collaboration across users, applications, and systems.

9 Claims, 17 Drawing Sheets

(56) References Cited

U.S. PATENT DOCUMENTS

2022/0327461 A1* 10/2022 Meehan ......... G06Q 10/063114

OTHER PUBLICATIONS https://www.jcs.mil/Doctrine/Joint-Doctine-Pubs/, Joint Publication 2-0 Joint Intelligence, Oct. 22, 2013, pp. 1-144.
https://www.jcs.mil/Doctrine/Joint-Doctine-Pubs/, Joint Publication 3-0, Joint Operations, Jan. 17, 2017 Incorporating Change 1 Oct. 22, 2018, pp. 1-224.
https://www.jcs.mil/Doctrine/Joint-Doctine-Pubs/, Joint Publication 3-30, Joint Air Operations, Jul. 25, 2019, Validated on Sep. 17, 2021, pp. 1-134.
https://www.jcs.mil/Doctrine/Joint-Doctine-Pubs/, Joint Publication 3-31, Joint Land Operations, Oct. 3, 2019, Incorporating Change 1, Nov. 16, 2021, pp. 1-208.
https://www.jcs.mil/Doctrine/Joint-Doctine-Pubs/, Joint Publication 3-33, Joint Task Force Headquarters, Jan. 31, 2018, pp. 1-352.
https://www.jcs.mil/Doctrine/Joint-Doctine-Pubs/, Joint Publication 3-25, Countering Threat Networks, Dec. 21, 2016, pp. 1-164.
https://www.jcs.mil/Doctrine/Joint-Doctine-Pubs/, Joint Publication 3-52, Joint Airspace Control, Nov. 13, 2014, pp. 1-99.
https://www.jcs.mil/Doctrine/Joint-Doctine-Pubs/, Joint Publication 3-35, Deployment and Redepolyment Operations, Jan. 10, 2018, pp. 1-150.
https://www.jcs.mil/Doctrine/Joint-Doctine-Pubs/, Joint Publication 3-53, Doctrine for Joint Psychological Operations, Sep. 5, 2003, pp. 1-125.
https://www.jcs.mil/Doctrine/Joint-Doctine-Pubs/, Joint Publication 2-01, Joint and National Intelligence Support to Military Operations, Jul. 5, 2017, pp. 1-220.

* cited by examiner

SYSTEM AND METHOD FOR ADVANCED MISSION PLANNING

RELATED APPLICATIONS

This application claims priority to U.S. Provisional Appl. No. 63/234,009, filed on Aug. 17, 2021. The contents of this provisional application are incorporated herein in their entirety.

FIELD

Exemplary embodiments generally relate to systems and methods that provide for a real-time, globally federated collaboration environment to support normalized Intelligence, Surveillance, and Reconnaissance Processing, Exploitation, and Dissemination planning, scheduling and reporting. Specifically, exemplary embodiments provide an open software architecture that allows for collaboration across users, applications, and systems.

BACKGROUND

The U.S. Department of Defense (DOD)/Intelligence Community (IC) operates somewhere between a $5 Billion and $8 Billion a year Aerial Intelligence, Surveillance, and Reconnaissance (A-ISR) enterprise spanning all Combatant Commands (COCOMs), Services, and Coalition partners with hundreds of daily missions supported around the clock by nearly ten thousand personnel. Spreadsheets and PowerPoint continue to be the primary tools to orchestrate most aspects of A-ISR mission planning, management, and reporting.

There is currently no common systems capability, tools, forms, or standards in place to enable comprehensive planning, allocation, tasking, and reporting solution. Each group cobbles together their own approach to manage data that entails considerable time spent inputting data from one sheet, slide, or system to another.

Interviews with servicemen and women indicate there are over 1,000 hours per day spent copying and pasting data equating to 180-man years at the cost of ~$23M annually. Furthermore, they estimate that once tasked, there is a 25%+ inefficiency/redundancy of operations across the enterprise. Based upon these numbers, the DOD is losing between $1.25 billion and $2.0 billion annually in the utility of their A-ISR enterprise at a time when the Government struggles to satisfy the increasing demand for Intelligence, Surveillance, and Reconnaissance (ISR) coverage, collection and analysis.

Current systems (such as GETS, Prism, Coliseum, Cougar, Unicorn, Compass, etc.) do not, and were not, designed to provide the necessary workflow and seamless interface to plan, manage and report on ISR operations and intelligence nor to make that data available in aggregate for analysis.

The vast scale of operations and data created in Excel, old databases, and stove-piped disorderly manner lend themselves to massive inefficiencies and degraded capability to support the warfighter at their desired scale, quality, and timeliness.

These and other drawbacks exist.

SUMMARY OF EXEMPLARY EMBODIMENTS

An exemplary embodiment includes a system having at least one server, the at least one server having at least one processor and computer memory and hosting an open architecture environment, and the at least one server being configured to: receive data from one or more external sources as multiple data streams, wherein the received data relates to Intelligence, Surveillance, and Reconnaissance (ISR) operations having multiple classifications levels; process the received data, the processing including geoprocessing to provide maps and layers relevant to the received data; normalize the received data, the normalizing including transforming the received data into one or more standard formats; store the normalized data in at least one repository that is configured to allow for the application of analytics, artificial intelligence, and machine learning to the normalized data; and display, via an interactive interface, the normalized data to one or more end users, the interactive interface comprising a real-time dashboard, a graphical display of a chain of command relating to military forces, a common operating picture, an organization and team management interface; and a hierarchical status and readiness reporting portion, wherein each end user is assigned a specific role defining a level of interaction with the system.

Another exemplary embodiment includes a system having at least one server, the at least one server having at least one processor and computer memory and hosting an open architecture environment, and the at least one server being configured to: provide a visual representation of a chain of command relating to military forces, wherein the chain of command has a plurality of individual commands; wherein each user in each of the plurality of individual commands receives information and options available based on a position within the chain of command, each user being associated with one or more units including at least one of air or ground Intelligence Surveillance and Reconnaissance (ISR) assets; accept input of information from each user regarding its associated one or more units; facilitate selection of the one or more units for deployment from a first location to a second location, wherein the second location is proximal to an area requiring services provided by the one or more units; receive inputs for requirements for planning of at least one mission that requires the one or more units; receive inputs allocating the one or more units to the at least one mission; prepare necessary tasking or operation orders for the one or more units for the at least one mission; display, in real-time to all users of the system, a worldwide status of a plurality of units including providing a live view, including at least full motion video from sensors associated with one or more units during mission execution; and generate, following completion of the at least one mission, one or more reports regarding the at least one mission.

Another exemplary embodiment includes a system having at least one server, the at least one server having at least one processor and computer memory and hosting an open architecture environment, and the at least one server being configured to: receive and process data from one or more external sources as multiple data streams, wherein the received data including Intelligence, Surveillance, and Reconnaissance (ISR) operations data and has multiple classifications levels; display, via an interactive interface, the processed data to one or more end users, the interactive interface including a real-time dashboard, a common operating picture, an organization and team management interface; a graphical display of a chain of command relating to military forces, and a hierarchical status and readiness reporting portion, wherein each end user is assigned a specific role defining a level of interaction with the system and the common operating picture is available to all end users, wherein the chain of command includes a plurality of individual commands; provide each end user information and options available based on a position within the chain of command and operational tasking requirements generated by other users at higher levels in the chain of command, each end user being associated with one or more units comprising at least one of air or ground Intelligence Surveillance and Reconnaissance (ISR) assets; accept input of information from each user regarding its associated one or more units, wherein the input of information comprises unit status and mission capability; and accept input from one or more users to update a position within the chain of command.

Exemplary configurations may: (1) provide open APIs for various primary data/sources, (2) provide a real-time, user centric dashboard, (3) provide seamless, intuitive, role-based workflow, (4) provide common air picture and intelligence images and data, (5) provide a common intelligence library, (6) provide organization, team, and personnel management, (7) provide platform, team locations (e.g., staging or overnight (i.e., beddown) locations)), (8) provide hierarchical status/readiness reporting, and (9) support multilingual collaboration (e.g., 22 languages and dialects).

These and other advantages will be described more fully in the following detailed description.

BRIEF DESCRIPTION OF THE DRAWINGS

In order to facilitate a fuller understanding of the various embodiments, reference is made to the attached drawings. The drawings should not be construed as limiting the various embodiments, but are intended only to illustrate different aspects and embodiments.

DETAILED DESCRIPTION

Figure 1:
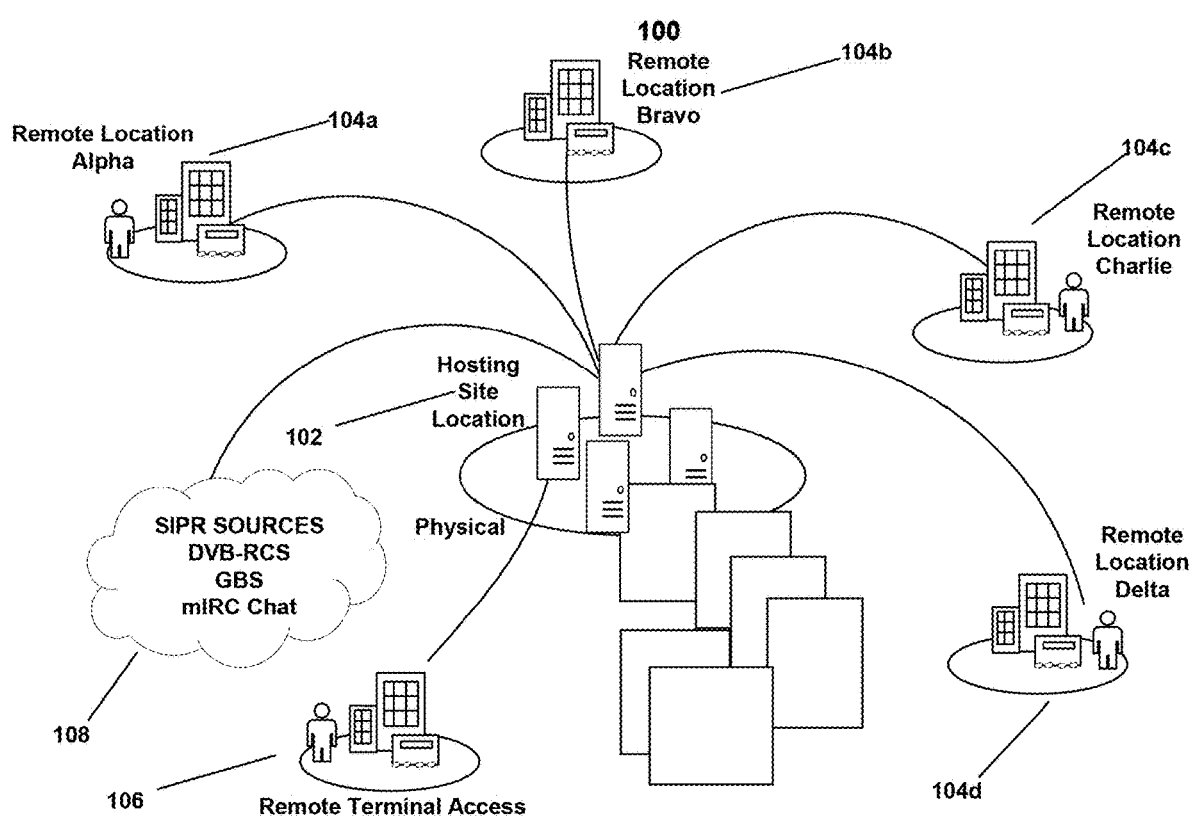
FIG. 1 depicts hosting site and user locations according to exemplary embodiments.

The following description is intended to convey an understanding of exemplary embodiments by providing specific embodiments and details. It is understood, however, that various embodiments are not limited to these specific embodiments and details, which are exemplary only. It is further understood that one possessing ordinary skill in the art, in light of known systems and methods, would appreciate the use of various embodiments for its intended purposes and benefits in any number of alternative embodiments, depending upon specific design and other needs. The following descriptions provide different configurations and features according to exemplary embodiments. While certain nomenclature and types of applications/hardware are described, other names and application/hardware usage is possible and the nomenclature provided is done so by way of non-limiting examples only.

Although exemplary embodiments may be described in the context of military or defense applications and environments, these contexts is exemplary and meant to be non-limiting. It should be appreciated that exemplary embodiments may have broader applicability and can be adapted to a variety of other contexts and environments, such as usage applications in industry or business to perform planning.

Exemplary embodiments provide a system that is specifically built to address the long-standing yet unsatisfied need for a real-time, globally federated collaboration environment to support normalized Intelligence, Surveillance, and Reconnaissance (ISR) Processing, including Air ISR (A-ISR) and ground ISR, Exploitation, and Dissemination (PED) planning, scheduling and reporting. Exemplary embodiments may be referred to as Advanced Mission Planning Software (AMPS) or LINX Mission Collaboration Suite (referred to as LINX; note: this is not an acronym) or merely, "the software" or "the program." These names are meant to be exemplary and non-limiting.

The exemplary embodiments may include descriptions regarding the use of the systems and methods in military related environments (e.g., warfighters may refer to military personnel). However, these descriptions are meant to be non-limiting as one of ordinary skill in the art will appreciate that exemplary embodiments have applications outside of these military environments and can be used where different organizations, having different hierarchies analogous to a military chain of command, interact and require fusion of different data sets and tasking such as, for example, in a civilian environment involving multiple partners (such as government agencies or non-governmental organizations or a combination thereof) working together in a joint venture or partnership across different time zones and geographic boundaries to accomplish a complex task involving a multitude of requirements and assets such as, for example, providing aid or assistance to a war-torn nation or a nation recovering from a natural disaster.

A central design goal of the software architecture of exemplary embodiments is to provide an open architecture allowing for collaboration across users, such as Department of Defense (DOD) branches, to include the collection management process, asset allocation, ISR platform status, unit, equipment locations, automatic generation of reports, and generating a common operating picture for all users. Utilizing the exemplary workflow, a genuinely open architecture may be implemented across the enterprise ISR networked systems. The open architecture is directed to normalizing ISR commands to gather and analyze valuable metrics to drive efficiency. The enterprise ISR database provides insight into the efficiencies and inefficiencies across the enterprise.

Core objectives for exemplary embodiments may include: 1) directly address the Service's long-standing yet unsatisfied need for a real-time, globally federated, collaboration environment to support normalized ISR mission planning, scheduling, and reporting (such as, for example, A-ISR); 2) establish the first-ever enterprise-wide foundation of ISR operations and intelligence mission planning and execution data repository for the application of advanced analytics, artificial intelligence, and machine learning (such as, for example, A-ISR); 3) establish a strong, standards-based foundation upon which to build more advanced operations and intelligence capabilities including machine learning and artificial intelligence. LINX automatically displays a Common Operating Picture (COP) based on user decisions. This COP is accessible to all users.

To provide maximum flexibility, exemplary embodiments may be platform agnostic and may be hosted on various platforms, including physical, virtual and in cloud platforms, such as AWS, Google, Watson, or Azure Cloud, and combinations thereof. The architectural strategy uses multiple servers, each designated to deliver a core capability. This modular application design enables the system to support scalability and optimal performance. As a result of the architecture used, exemplary embodiments provide a technological solution to the technical problems identified above. Specifically, the program of exemplary embodiments is designed in a modular form of components for optimized performance and system scalability. The technical architecture manages the components that operate separate servers (or Virtual Machines (VM)) to deliver the program to the users. The front-end components may be configured to work seamlessly with the DVB/GBS (Digital Video Broadcast/Global Broadcast Service), Data Processing, and Geo-Processing Suite as a the complete LINX program. The LINX program provides each user a unique interface designated by the unit they are assigned to and the duty position(s) they are responsible for. Furthermore, the system is designed to be hosted on either a cloud environment (e.g., Amazon Web Services (AWS), Google, Watson, Azure, etc.) or a server environment (or combinations thereof in some embodiments) to provide flexibility for installation and maintenance. Additionally, while the hardware of exemplary embodiments may be agnostic, the programmed elements are unique with respect to exemplary embodiments; that is, the software solution provided by exemplary embodiments is unique and specific as described herein. Accordingly, exemplary embodiments improve the functioning of the hardware as described herein. As a result, exemplary embodiments amount to more than mere conventional, off the shelf hardware but a unique solution to a long-standing problem as described in the background and further below.

Exemplary embodiments address the long-felt but heretofore unsatisfied need for a real-time, globally federated collaboration environment in support of normalized ISR PED planning, scheduling, reporting, and thus addressing the deficiencies detailed in the background section above.

Embodiments of the software architecture provide an open architecture program that allows for and facilitates collaboration across the United States Department of Defense (DoD), achieving heretofore unachievable efficiencies within the enterprise. For example, while the exact numbers are classified and thus cannot be included here, the DoD has purchased thousands of aerial ISR aircraft since 2001, both manned and unmanned. The DoD, Air Force, Army, Navy, Marines, and Special Operations Command have developed over 25 different databases and programs to track missions and intelligence produced by these aircraft. The DoD Geographic Combatant Commands plan and execute over 7,000 missions per month employing an estimated 4,000 to 5,000 personnel daily. Because these different databases and commands serve specific users and are not available to all users and command, these personnel must use email, chat, PowerPoint, Word, and Excel files to coordinate these missions and communicate across the enterprise. LINX is designed to support all users across the enterprise on one common software platform (i.e., the program) to improve operational speed and accountability and efficiency. See, e.g., https://defenseinnovationmarketplace.dtic.mil/wp-content/uploads/2018/02/CJCS_ISRJointForce2020WhitePaper.pdf (Intelligence, Surveillance, and Reconnaissance Joint Force 2020 White Paper, 2014, that describes the challenges that continue to limit the U.S. DoD).

The LINX Mission Collaboration Suite or program, according to exemplary embodiments, automates and integrates processes that are currently being done manually with a plurality (e.g., 10-15) of different databases, as well as stand-alone, non-automated programs such as Word, PowerPoint, Excel, and email. The LINX Mission Collaboration Suite is fully compliant with all applicable Department of Defense joint requirements.

Exemplary embodiments have several unique functions that are not available in other software programs used by the DoD:

A chain of command with multiple unit relationships that is user configurable and all processes in the software follow the chain of command;

Multiple user roles that mirror unit duty positions;

User interfaces with data specific to each unit and duty position for very quick and accurate decisions;

Automates the military intelligence requirements management process described in the Department of Defense Joint Publication 2-0;

Automates the military intelligence, surveillance, and reconnaissance (ISR) plan and execution processes described in Department of Defense Joint Publication 2-0 and 3-0; and Exemplary embodiments combine elements from Joint Publications 2-0, 2-01, 3-0, 3-30, 3-31, 3-33, 3-35, and 3-53, which can be found at this location: https://www.jcs.mil/Doctrine/Joint-Doctine-Pubs/.[1] No other program combines elements from these publications into one software package; stated differently, LINX is the only program designed for units to manage and conduct ISR operations.

[1] Joint Publications 2-0 Joint Intelligence and 2-01 Joint and National Intelligence Support to Military Operations define the joint doctrine for unit intelligence organization and functions. These publications provide the Military Services and Combatant Commands the guidance for how to organize and conduct intelligence analysis, staffing, and collection plans as well as provide the processes for units to collaborate from tactical to national agencies. These publications provide unit commanders with guidance for the unit Intelligence Staff, normally designated as S2/G2/N2/A252/C2. Joint Publications 3-0 Joint Operations, 3-30 Joint Air Operations, 3-31 Joint Land Operations, 3-33 Joint Task Force Headquarters, 3-25 Countering Threat Networks, and 3-52 Joint Airspace Control define the joint doctrine for unit operations organization and functions. These publications provide the guidance for how to organize, staff, and develop operational command and control of joint forces as well as provide the process for units to collaborate to conduct air, ground, and maritime operations in a variety of combat and non-combat conditions. These publications provide unit commanders with guidance for the unit Operations Staff, normally designated as S3/G3/N3/A353/C3.

Various embodiments may include the ability to manage maritime and shipborne assets, in addition to ground and air assets as described herein. In some embodiments, in addition to ISR assets, tactical assets such as ships, fighters, bombers, armor units, etc. may be managed, including status of weapon loadouts and inventories. Thus, although examples in the description below may refer to air and ground units, as well as ISR units, this is meant to be exemplary and non-limiting. In various embodiments, artificial intelligence may be implemented to allow for better management and decision making regarding asset allocation and distribution.

FIG. 1 the system 100 having a physical hosting site 102 and user locations Alpha through Delta (104a, 104b, 104c, 104d; collectively, 104) according to exemplary embodiments. At least one user location 106 may include remote terminal access. Sources 108 input into the hosting site 102. The hosting site and user locations depicted in FIG. 1 are exemplary and meant to be non-limiting. For example, the hosting site and user locations depicted are but one possible set of sites and locations that may be used. FIG. 1 depicts an implementation to support certain military or defense operations, however other implementations for civilian usage are possible. The hosting site 102 and user locations 104 (a through d) may change based on the support and configuration required by the particular implementation. Exemplary embodiments have the ability to be hosted on any platform, physical and/or virtual, and in any cloud environment (e.g., Amazon Web Services (AWS), Google, Watson, or Azure Cloud). In the Figure, SIPR refers to Secret Internet Protocol Router, DVB-RCS stands for Digital Video Broadcast-Return Channel over Satellite, GBS stands for Global Broadcast Service, and mIRC stands for Internet Relay Chat. According to exemplary embodiments, the system connects to the SIPR network for user connections and to the DVB and GBS satellite networks for full-motion video streams. According to exemplary embodiments, a stable 30-50 MG/s connection between the hosting site and user locations is desired.

The hosting site 102 may receive data from different external sources which may include video streams and other data. The data received may have multiple classification levels and may related to A-ISR operations. The received data may be processed by one or more servers located at the hosting site or located in the cloud or a combination of servers located at different locations. The processing may including geoprocessing to provide maps and relevant layers to the received data. The received data may then by normalized. Normalization may include transforming the received data into a standard format or multiple standard formats. The normalized data may be stored in a repository. Once stored, the data may be accessed and analytics, artificial intelligence and machine learning, as non-limiting examples, may be applied to the data. The normalized and analyzed data may be then be accessed by and displayed by end users, such as users located at user locations 104 and 106. Users may be also to access an interactive interface that includes a real-time dashboard, a common air and intelligence portion, an organization and team management interface; and a hierarchical status and readiness reporting portion. Each end user may be assigned a specific role defining a level of interaction with the system which determines what normalized data, features and displays the user may be able to access.

According to exemplary embodiments, the following user roles may be supported:

Leadership;
Intelligence;
Intelligence+Supervisor (or Super);
Collection Manager;
Collection Manager+Super;
Operations;
Operations+Super;
Mission Manager;
Mission Manager+Super;
Air and PED Operations;
IT Admin;
Tradecraft User; and
Personnel.

The above listed roles are exemplary only and other roles and combinations of roles are possible. Further, each role may have specific permissions associated with it that expand or restrict the types of interactions each role may have within the system.

Security of the system of FIG. 1 is important given the sensitivity of the data handled by the system. To that end, specific user security may be implemented.

User session ids are implemented using C# ASP.Net Core Authentication which utilizes a cryptographic Random Number Generator (RNG) to generate the id. This Cryptographic RNG is FIPS compliant. Session ids are also encrypted by default with ASP.Net Core Authentication. As the session ids are encrypted with ASP.Net, they are further validated by using Json Web Tokens (JWT), which is part of the ASP.Net Core framework. This validation is carried out for every API call the user makes within the application.

Further encryption for session information is carried out from the enforced use of TLS 1.2. Session ids are not renewed, if there is an event that causes the session id to become invalid, for example a user's account is modified by an administrator while they are signed in, the user will be logged out and redirected to the login page.

A user session can be created in only one way, the user logs into the application. However, there are multiple ways in which a user session can be terminated, aside from the user's own action to log out of the application, in order to prevent "zombie" access to the system.

The first way in which a user session will be terminated, is if the user is currently logged into the application, and their account has been deleted while they are signed in. This action will cause their session token to become invalid to the application, and the next action the user attempts to make will result in the termination of their session. This ensures that an individual that is no longer permitted access to the application will be unable to continue navigating through and interacting with the application during the user session they had created while their access was still permitted.

Another way in which user sessions are terminated is for their permissions to the application to be altered while they are logged into the application. Any alteration to the user's account will result in their access token to the application to become invalid, which will cause the user's session to terminate upon the next action they make within the application. The next way a user's session can be terminated is if the users session is left sitting idle for too long. Allowing the application to remain open if the user forgot to log off would put the system at risk, and so to counteract that risk, there is an idle time limit of 15 minutes set for regular non admin users, and a time limit of 10 minutes set for admin users. If this time limit is reached, the user's session is terminated, and the application will redirect to the login page.

When a user logs into the application, temporary storage and session cookies are created for the duration of the users session to assist with the performance of the application. This storage data is used to check the credentials of the signed in user and determine what aspects of the application they have access to, to keep track of the amount of time spent idle so if the user's session exceeds the limit of idle time they are signed out, as well as to ensure the security of the users session.

There is only one session cookie in use within the application structured by using ASP.Net Core. This framework stores the user's session id in the cookie so ASP.Net can reuse the singular cookie to transmit user data to the server. As described above, a user session can be terminated in a multitude of ways. It is ensured that when the user session is terminated, any temporary data as well as the session cookie is cleared out.

Passwords are hashed utilizing Microsoft Identity (as a non-limiting example, as other comparable applications may be used that provide similar functionality) and are stored in encrypted tables. Passwords are transmitted cryptographically through the use of HTTPS:// The ability to change a user's password is reserved for the individual user themselves, or for the administrator users of the application that are able to reset the users password if needed. Upon the user's password being reset, the user will be asked upon first logon to the application to change the temporary password they had been given. If however, the user is updating their password themselves, it is enforced that the new password has at least 8 characters changed from the user's previous password. To ensure that passwords are changed regularly, the frequency in which users change their passwords is tracked. If a user has not changed their password in 60 days, upon login at the 60 day mark they will be prompted to do so. Similarly, a user is not able to change their password or have their password reset more than once within a 24-hour period. Along with the constant checking of how frequently a user is updating their password, it is also prohibited for a user to reuse an old password for five password generations. The complexity of any password to the application is strictly enforced to include at least one uppercase letter, one lowercase letter, one numeric character, and one special character, as well as needing to be at least 15 characters in length.

As a further security limitation, the use of mobile code within the source code for the application is limited to JavaScript and PDF's, both of which are listed in the categorized list of acceptable mobile code.

Figure 2:
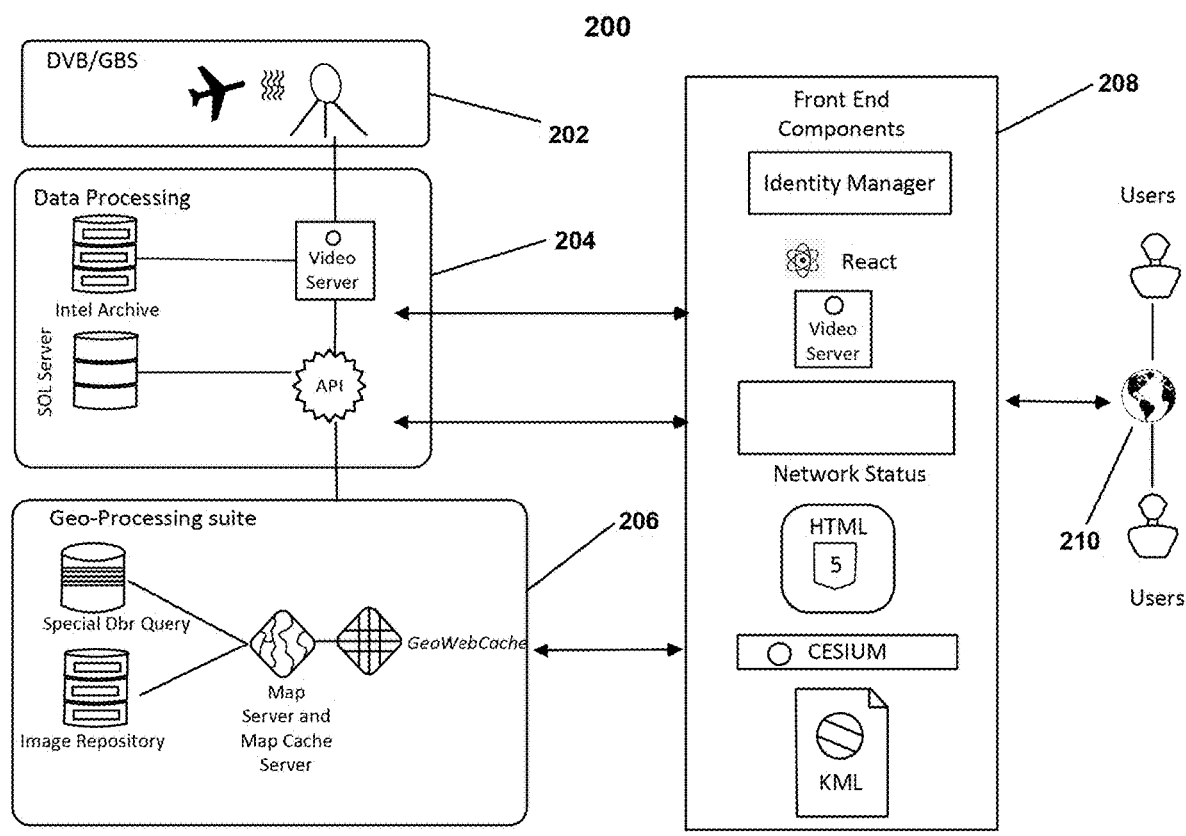
FIG. 2 depicts a system according to exemplary embodiments.

FIG. 2 depicts a system 200 according to exemplary embodiments. The components depicted in the system 200 are exemplary and non-limiting. The system 200 may have an input from DVB/GB, a data processing portion 204, a geo-processing suite 206, front-end components 208, and users 210. DVB/GBS stands for Digital Video Broadcast/ Global Broadcast Service.

In exemplary configurations, the core components of the software of system 200 may include:
Internet Information Services (IIS) Webserver (as part of the data processing portion 204);
Map and Map Cache Sever (as part of the geo-processing suite 206);
PostGIS map repository with OpenStreetMap data layers (as part of the geo-processing suite 206);
Video server (as part of the data processing portion 204); and
SQL database with an open Application Programming Interface (API) (as part of the data processing portion 204).

Figure 4:
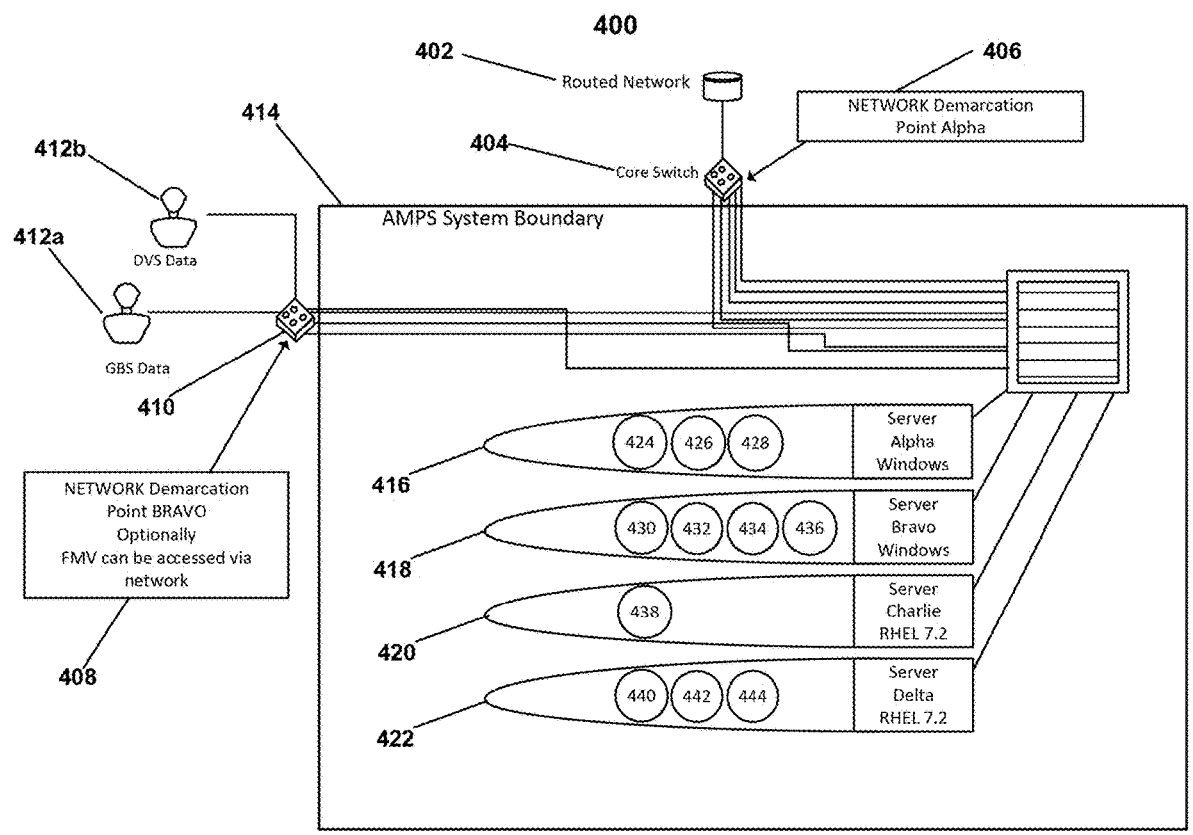
FIG. 4 depicts a system according to exemplary embodiments.

In exemplary configurations, the components of the application modules for webserver and database are hosted on a Windows 2016 standard server operating system and RHEL 7.2 for the maps and video modules. For example, the software may be run on VMware ESX 6.5, AWS EC2 instances, and physical server hardware, as well as other comparable systems. Exemplary embodiments may include modular components that may be approved DOD established software having previously been included in Air Tasking Order (ATO) packages through the DOD and US Army security policies or other required certifications. FIG. 4 (described below) depicts the server configuration according to exemplary embodiments.

According to exemplary embodiments, the front-end web application (such as front-end components 208) connects to the API (which is part of the data processing suite 204) to communicate data served from the database. By using this layer of abstraction, changes to the database may occur without requiring changes in the front-end layer. This also allows for optimization technologies to be used to serve the data quicker versus direct queries to the database. The API also provides for numerous other clients to connect for multiple extensions such as ad hoc reporting as well as automation of repetitive tasks. The front-end and the API are not required to be installed on the same server. The API may require a user to authenticate themselves, using the OAuth2 protocol to obtain a token, before consuming the endpoints.

Figure 3:
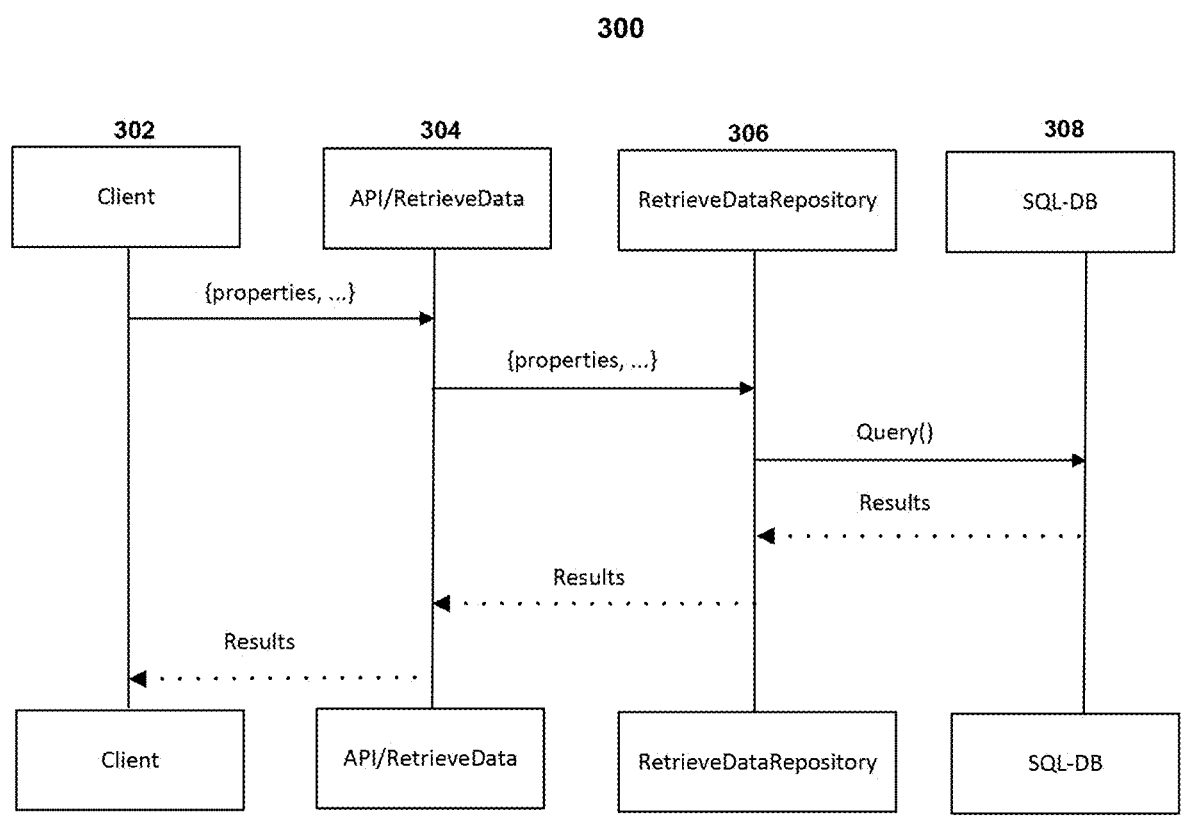
FIG. 3 depicts a web application design and flow according to exemplary embodiments.

According to an exemplary embodiment, the API may be coupled with the database. For example, the API's data models may be built dynamically based on the current database structure and further allows for several caching and data optimization technologies to be used to serve the data quicker to the API consumers. For example, the API and the database may be hosted on the same server to allow for minimum latency between the two. Other configurations may be supported. FIG. 3 (described below) depicts an exemplary web application design and flow.

For the database, according to exemplary embodiments, a SQL Server may be used and be a part of the data processing portion 204. The SQL Server represents a relational database management system (RDBMS) that supports a wide variety of transaction processing, business intelligence, and analytics applications in corporate IT environments. The SQL Server is built on top of SQL, a standardized programming language that database administrators (DBAs) and other IT professionals use to manage databases and query the data they contain. There are stored procedures that are coded within the database as well to provide optimization for some more significant queries as well as to offer a queueing service for routine updates (i.e., status checks).

To optimize the use of the database, the application program interface (API) may be used to allow for access using a standards-based architecture. The API may be used primarily as a gateway between the front end React.js code and the database. The architecture of the API is built using REST principles and could be consumed by other clients based on various applications and use cases.

The API internal design may be divided into two major categories of endpoints: (1) collection management (personnel, platforms, etc.) and (2) business logic/actions (intel request/mission management workflows).

In exemplary embodiments, the API may use OAuth2 authentication. Using a user ID and password provided by the end-user, the API may generate a time-bound token that may allow access to the API functions for a set amount of time (in exemplary configurations, the default may be set to 30 minutes). Each user may have one or more roles assigned to them, which allow access not only to specific areas in the system but also limits which the user can utilize API endpoints. A Super Admin user role that allows access to everything in the system.

The API may be invoked from any source that can submit an HTTPS request. Each endpoint has its data parameter requirements. HTTPS responses may default to JSON; however, the API can also support XML responses in various embodiments.

Exemplary embodiments may use and comply with numerous industry standards to enable Server Oriented Architecture (SOA)-based and Web services-based capabilities for Network Centric Enterprise Services (NCES), including the Organization for the Advancement of Structured Information Standards (OASIS) UDDI and ebXML specifications; the World Wide Web Consortium's (W3C) SOAP, WSDL, WS-Security, and other WS-* specifications; the Web Services Interoperability Organization's (WS-I) WS-I Basic Profile, as well as industry best practices such as patterns for Representational State Transfer (REST).

In exemplary embodiments, the front-end system may be integrated to a GeoServer backend (such as part of geoprocessing suite 206) to serve maps of various locations and different scales of detail. For example, CesiumJS (as part of the front-end components 208) may manage user interactions and then make calls Map Server and Map Cache Server to serve various maps and layers to users, applications and systems.

The Map Server and Map Cache Server may maintain one or more data sources (layers) of various types (e.g., imagery, vector). Each imagery data source may comprise of select imagery of a certain location (e.g., Boston) or may contain imagery that will cover the entire map. The user may view each data set at different zoom levels, and upon different zoom levels higher-quality imagery may appear as the view shed is more focused to a particular area. Vector based layers, allow for custom map styles (e.g., continent color, road color, font size, font color). Additionally, the use of zoom levels may also affect the appearance to the user as different rules may be applied.

This map and map cache server may represent an open-source software server written in Java that allows users to share and edit geospatial data. Designed for interoperability, it may publish data from any major spatial data source using open standards. PostGIS (described below) and the imagery file repositories may represent data sources for the map data display that is served to the Cesium front end component.

In exemplary embodiments, a Wowza Streaming Engine may be used and be a part of the data processing portion 204 as a video server. This streaming engine may include a unified streaming media server software developed by Wowza Media Systems. The server may be used for streaming of live and on-demand video, audio, and rich Internet applications over IP networks to desktop, laptop, and tablet computers, mobile devices. The Wowza video engine may accept the UDP video stream with KLV embedded and allow for the video to be viewed from the web application. The server may include a Java application deployable on most operating systems. In various embodiments, other video server types may be used.

PostGIS represents a database, as part of the geo-processing suite 206, which adds spatial functions such as distance, area, union, intersection, and specialty geometry data types to PostgreSQL Spatial databases store and manipulate spatial objects like any other object in the database. This database may hold stored data of different types (e.g., numeric, text, timestamps, images, etc.) and, when needed, the database may query (fetch) that to answer questions with the data. Exemplary queries may relate to: 'how many people logged on to your website' or 'how many transactions have been made in an online store.' Spatial functions may answer questions such as 'how close is the nearest shop,' 'is this point inside this area' or 'what is the size of this country'. The data may be stored in rows and columns in PostGIS as a spatial database. For example, the information may also have a geometry column with data in a specific coordinate system defined by spatial reference identifier (SRID).

Open Street Map (OSM) data may be stored in the POSTGIS database, which is attached to Map and Map Cache Server. The Open Street Map data repository may be used to enable a variety of capabilities, including enabling regional indexing of Geospatial data and using Open street map data. Embodiments may search the following exemplary data fields:

Cities, towns, suburbs, villages, etc.;
Points of Interest;
Public facilities such as government offices, post office, police, hospitals, pharmacies, culture, restaurants, pubs, cafes, etc.;
Hotel, motels, and other places to stay the night;
Supermarkets, bakeries, etc.;
Tourist information, sights, museums, etc.;
Places of worship such as churches, mosques, etc; and
Natural features.

OpenStreetMap (OSM) represents a collaborative project to create a free, editable map of the world. The data from OSM may be used in various ways including the production of paper maps and electronic maps, geocoding of addresses and place names, and route planning.

FIG. 3 depicts a web application design and flow 300 according to exemplary embodiments. A client 302, API/RetrieiveData 304, RetrieveDataRepository 306, and SQL-DB 308 are depicted. The web services of exemplary embodiments may use a Model View Controller (MVC) scheme for layers of separation, between the server and client. Each web Application Programming Interface (API) endpoint may be designed as an asynchronous task, thus enabling for faster response times for the end user. Requests from the Web Application client (JavaScript) may utilize a Promise based AJAX mechanism. This may allow for the browser to not to block/stall and gives the appearance of waiting for the response. Multiple web requests may happen in-conjunction, without blocking the client's browser. Each web request may return a status code (e.g., 200, 201, 401). This is one approach feature to mitigate deadlock. The server may utilize design patterns Dependency Injection and Repository as a base foundation for every API request. This approach also mitigates deadlock due to the resource assignment of the given area, from the server itself.

FIG. 4 depicts a system 400 depicting the physical components and boundaries according to exemplary embodiments. External Routed Network 402 may be communicatively coupled to External Core Switch 404. This may represent Network Demarcation Point Alpha 406. A second demarcation point, Network Demarcation Point Bravo 408 may be communicatively coupled to second External Core Switch 410. GBS data 412a and DVS data 412b and may also input into this core switch 410. The Routed Network 402, may be any type of Network, including a classified network. In the Figure, DVS stands for Digital Video System, GBS stands for Global Broadcast Service, and FMV stands for full motion video. The system boundary is depicted at 414.

In an exemplary configuration, within the system boundary 414, the hosting platform may include four physical 2U servers further including four 2U Dell R740 servers. In this example, the system may have four servers, two server configurations differentiated by the size of the storage arrays (labelled as Server Alpha (416), Server Bravo (418), Server Charlie (420), and Server Delta (422)).

Exemplary embodiments may have four server component types:
  Map Module;
  Video Module;
  Webserver module; and
  Database module.

According to exemplary embodiments, Internet Information Services (IIS) may be used in the Webserver module. IIS represents a web server software package designed for Windows Server. It may be used for hosting websites and other content on the Web. Microsoft's Internet Information Services provides a graphical user interface (GUI) for managing websites and associated users. It provides a visual means of creating, configuring, and publishing sites on the web. The IIS Manager tool allows web administrators to modify website options, such as default pages, error pages, logging settings, security settings, and performance optimizations. For example, when a visitor accesses a page on a static website, IIS sends the HTML and associated images to the user's browser. When a page on a dynamic website is accessed, IIS runs any applications and processes any scripts contained in the page, then sends the resulting data to the user's browser.

The larger storage servers may be used for the database and map modules, while the smaller storage systems may host web services as well as video distribution systems. The map and database servers with the larger storage arrays (for example, 24.96 terabytes) and may be referred to as "hardware server type one." Server type one servers are identifiable in FIG. 4 as servers Alpha (416) and Delta (422). The webserver and video servers may have a smaller storage capacity (for example, 11.52 terabytes RAW) and may be referred to as "hardware server type two." Hardware server type two servers are identifiable in FIG. 4 as servers Bravo (418) and Charlie (420). Servers Alpha and Bravo may host Windows server based operating systems. Servers Charlie and Delta may host RHEL 7.2 operating systems. The windows servers Alpha and Bravo may use Virtual machines hosted in Microsoft Hyper V hypervisors. Each virtual machine may host a windows server, such as a Windows 2016 instance.

In the system 400, Server Alpha (416) may host the SQL Primary VM (424), the KLV Parser1 VM (426), and the KLV Parser2 VM (428). Server Bravo (418) may host the Webserver IIS (430), KLV Parser3 VM (432), KLV Parser4 VM (434), and DOT NET CORE with Signal IR (436). Server Charlie (420) may host the Wowza Video Engine (438). Finally, Server Delta (422) may host the GeoServer (440), PostGIS (442), and POSTGREST (444). These are exemplary hosting configurations and are non-limiting.

For network purposes, each Hyper-V hosted server may use a shared network connection to the SIPR network host along with a separate connection to the full motion video stream connection on a segregated NIC to the KLV parsers as well as the Wowza streaming engine. The Red Hat 7.2 servers Charlie and Delta may operate docker containers for the modules.

Figure 5:
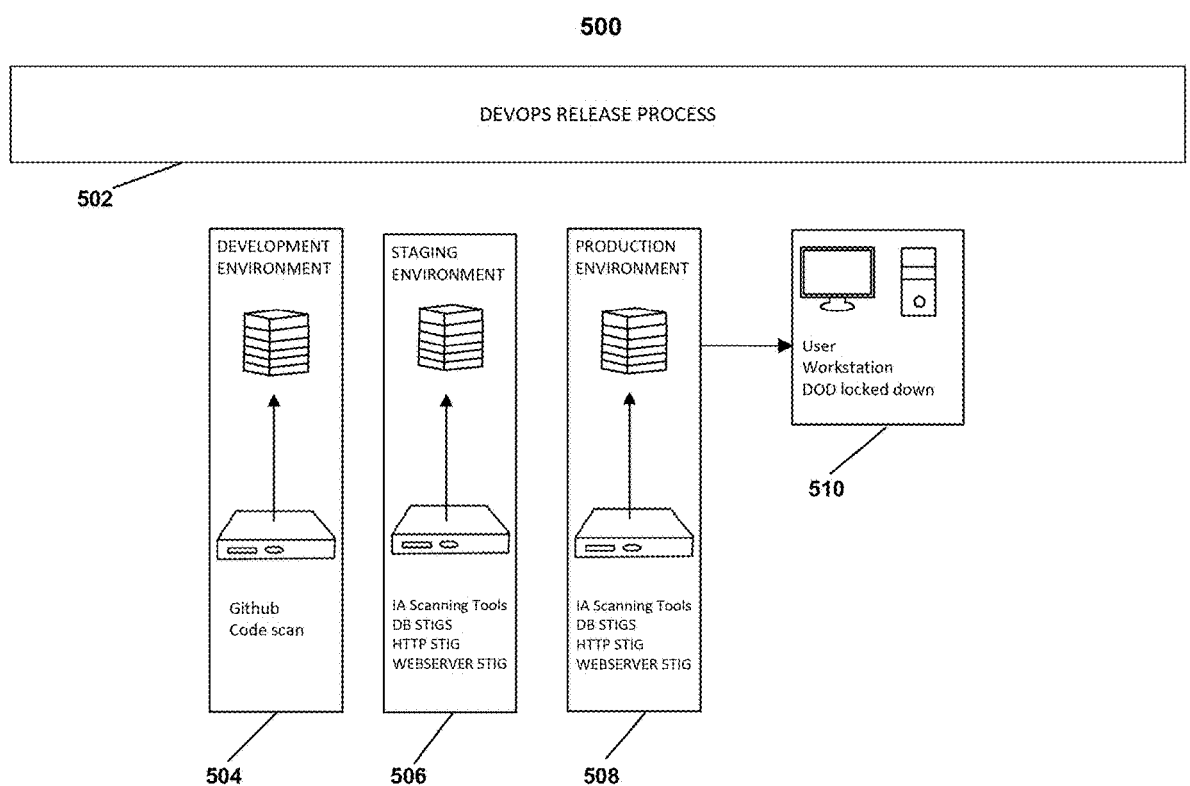
FIG. 5 depicts an Information Assurance (IA) focused development environment according to exemplary embodiments.

FIG. 5 depicts an Information Assurance (IA) focused development environment 500 according to exemplary embodiments. The DEVOPS Release Process 502 may include development environment 504, staging environment 506, and production environment 508, and user workstation 510. This development environment may enable developers to create products in an agile system and keep track of versions, branches, and bugs. The staging environment may be used to install and test releasable packages to ensure that all client requirements are met prior to release into the production environment and use by end users and clients. In the staging environment, quality assurance testers may test the product for bugs or issues and return the product back to developers for fixing and repackaging.

Figure 6:
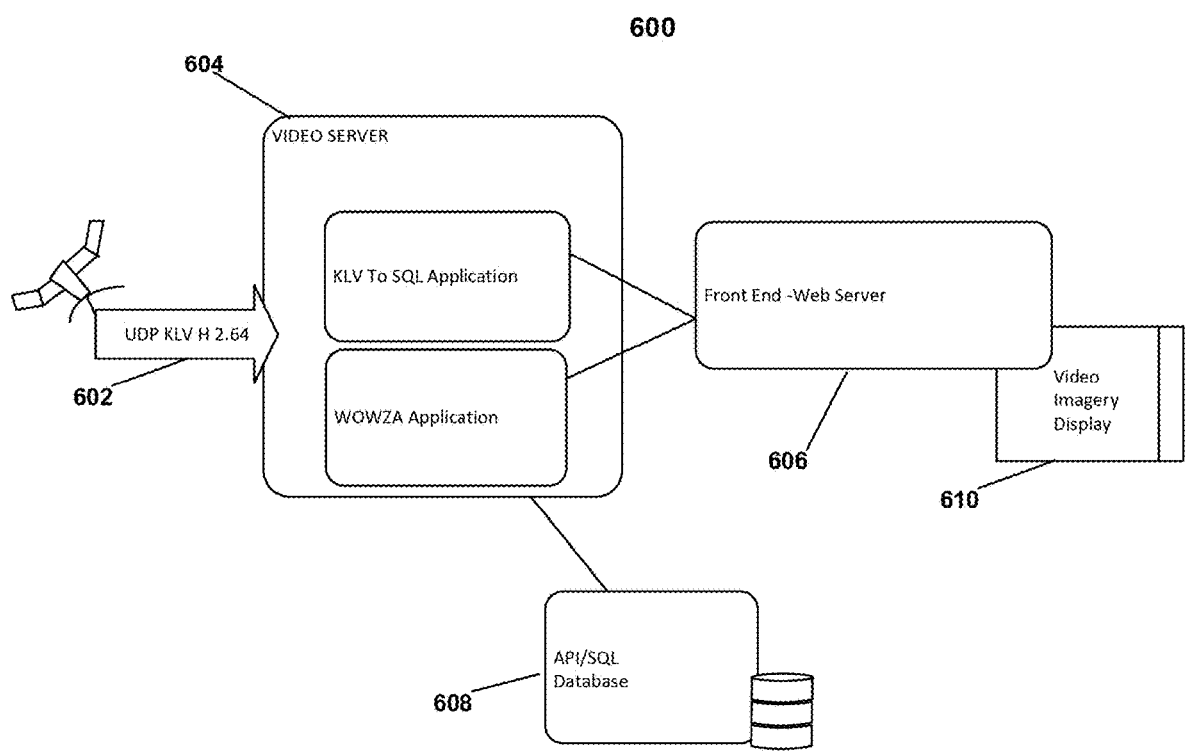
FIG. 6 depicts input of video streams according to exemplary embodiments.

FIG. 6 depicts input of video streams according to exemplary embodiments. In the system 600, video source 602 may be input into the video server 604 and then subsequently processed in the front end web server 606 and displayed at video imagery display 610. An API/SQL Database 608 may be communicatively coupled to the video server 604. The video source may be a UDP KLV H.264 video stream such as a from a satellite source. It should be appreciated that other video stream formats may be used. The video streams may include data having multiple different classification levels (e.g., Top Secret, Secret, and/or Unclassified). In the video server 604, the KLV may be processed into a SQL application. It should be appreciated that although video streams are depicted as the input, the input may be different types of data, including combinations of different types of data, such as data relating to A-ISR operations.

The WOWZA application may be located in the video server as shown at 604. The WOWZA application (video engine) may accept the UDP stream with KLV embedded and allow for the video to viewed from a web application. The video server 604 may be cloud based, such as on the Amazon Web Services cloud. Other cloud services may be used. The video server 604 may be secure. The front end web server 606 may likewise be cloud based. It may be based on the same cloud (e.g., Amazon Web Services) as the video server. In various embodiments, it may be located in a different cloud and/or different service. The front end web server 606 may be secure. The API/SQL Database 608 may be similarly cloud based and may be hosted by a different cloud than the video server and the front end. Indeed, the system 600 depicts exemplary cloud locations for each of the video server 604, the front end 606, and the API/SQL Database 608. The display at 610 may be at a user location which may be located remotely from the video server and front end. The display 610 may be at a user workstation.

Figure 7:
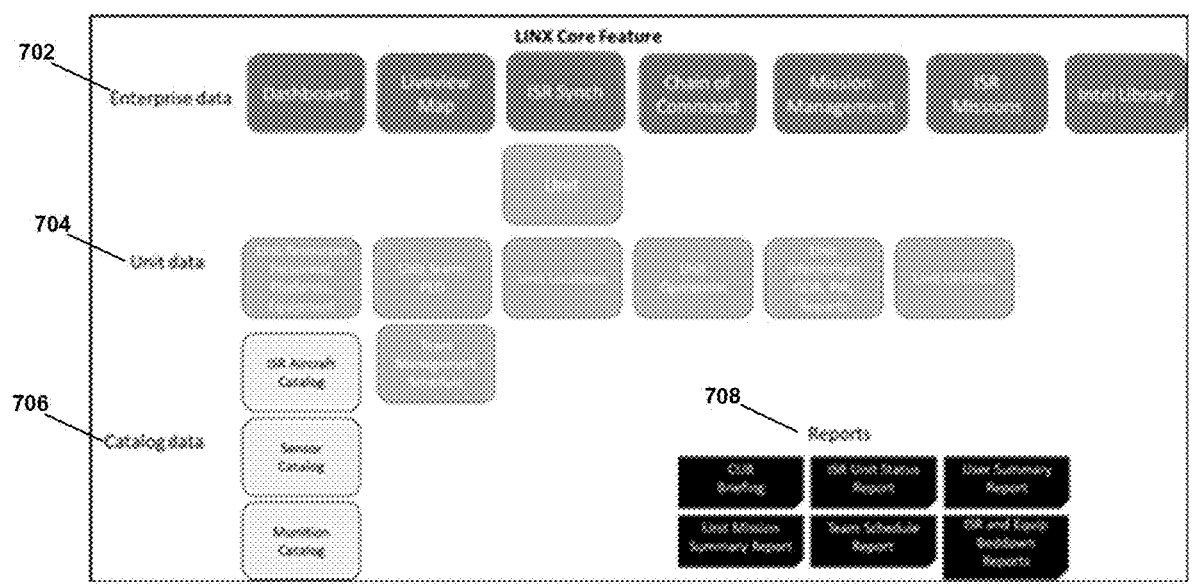
FIG. 7 depicts data layers of the program according to exemplary embodiments.

FIG. 7 depicts the data layers 700 of the software which include Enterprise Data 702, Unit Data 704, Catalog Data 706, and reports 708.

Enterprise data 702 is data that may be commonly displayed to all users of the system using the program software. Enterprise Data is created by unit level users' decisions to request resources, plan missions, and completed missions. The program's information security function can limit data based on user defined security clearance and country dissemination authorizations. Enterprise data may include, as shown in FIG. 7 at 702, dashboard, liveview map, ISR synch, chain of command, mission management, ISR missions, and intel library.

Unit data 704 may be composed of personnel, equipment, and information specific for each unit. This information is entered by the users based on the resources and personnel assigned to each unit. The resources are designated by the unit's authorization and assigned resources. Unit and user roles (Leadership, Operations) determine access to add and edit information for each unit. Only authorized users in the unit can add, edit, and delete unit information. In some embodiments, unit information can be classified as 'Enterprise data' and shared to all users. Unit data may include, as shown in FIG. 7 at 704, units, unit resources, personnel, platforms, equipment, unit teams Processing, Exploitation, and Dissemination (PED), team management schedules, unit locations, unit operations, unit information, unit operational orders (OPORD).

Catalog data 706 may include the individual equipment specification information such as weight, speed, distance, and manufacturer. Catalog data may include, as shown in FIG. 7 at 706, ISR aircraft catalog, sensor catalog, and munition catalog. This information is entered by users and is specific to each type of aircraft, sensor, munition, equipment, and vehicle. The information is derived from the manufacturer's operational specifications. Data can be created and edited by User Roles (Leadership, Operations, IT ADMIN) with information on the operational specifications of the resources.

For reports 708, the software can provide users with automatic reports generated from Enterprise, Unit, and Catalog Data. Reports may be exported in PowerPoint, Word, Excel, and KML formats in accordance with U.S. Department of Defense classification guidance or other applicable guidance according to exemplary embodiments. In FIG. 7, the reports shown at 708 are examples of automatically generated reports. These reports may include Commander's Update Brief (CUB) report, ISR unit status report, user summary report, unit mission summary report, team schedule report, and ISR/Equipment beddown reports. The automatically generated reports may be forwarded to appropriate chain of command units to provide updates. In some embodiments, the reports may be forward into other systems to update such systems and users of such systems.

Figure 8:
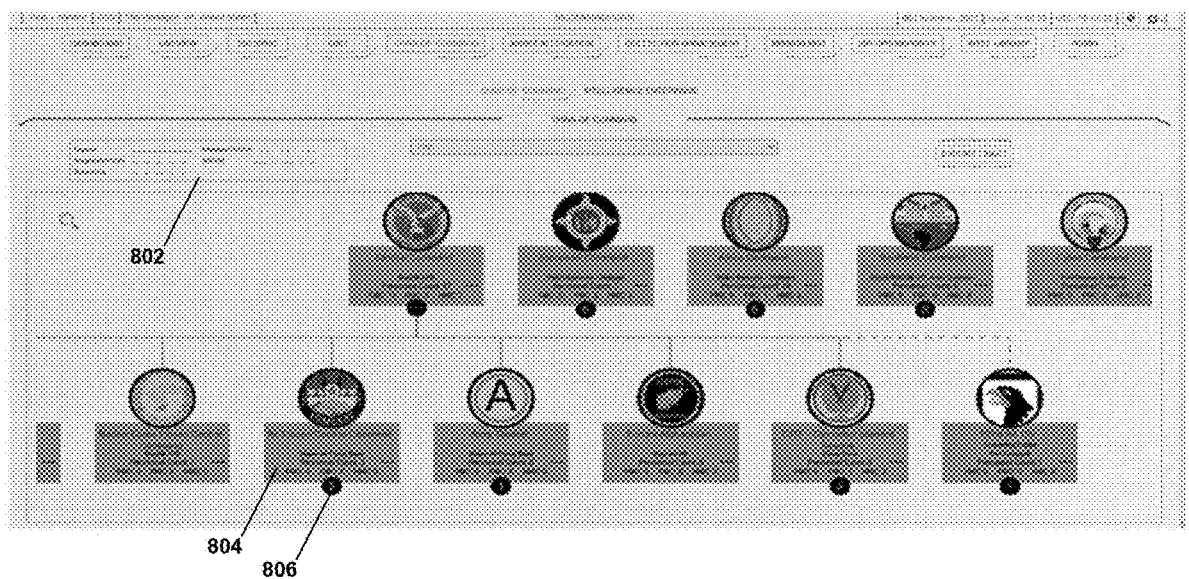
FIG. 8 depicts an screenshot of an exemplary chain of command according to exemplary embodiments.

FIG. 8 depicts a screenshot 800 of a chain of command display that can be used to manage unit relationships and user defined positions. This shows the relationships between units. The software has a chain of command module for national defense with five military type unit relationships (802). The relationships displayed are: organic, assigned/OPCON (Operation Command), attached/TACON (Tactical Command), supporting, and ADCON (Administrative Command). The display at 802 may use different line types and/or colors to represent the different unit relationships. The chain of command module defines the process for orders to subordinate units and reports to higher headquarters. Each command (e.g., Air Forces Central Command at 804) has its logo included as well as informational box. The information box provides the command name, its location (HQ), and a listing of the asset status (displayed as Full Mission Capable (FMC), Partial Mission Capable (NMC), and Not Mission Capable (NMC)). Further, there may be an indicator (806) that shows subordinate commands. This indicated 806 may be clicked or actuated and those subordinate commands will be displayed. For example, Air Forces Central Command has two subordinate commands that can be displayed.

The software has user defined positions in accordance to military staff positions for leadership, operations, intelligence, information technology, and other positions. The software will provide users the ability to classify information with dissemination guidance in accordance with US DoD standards or other applicable guidance. In various embodiments, users can adapt the chain of command for specific scenarios and use cases. The unit relationships provide information to each user's interface and capture decisions.

Figure 9:
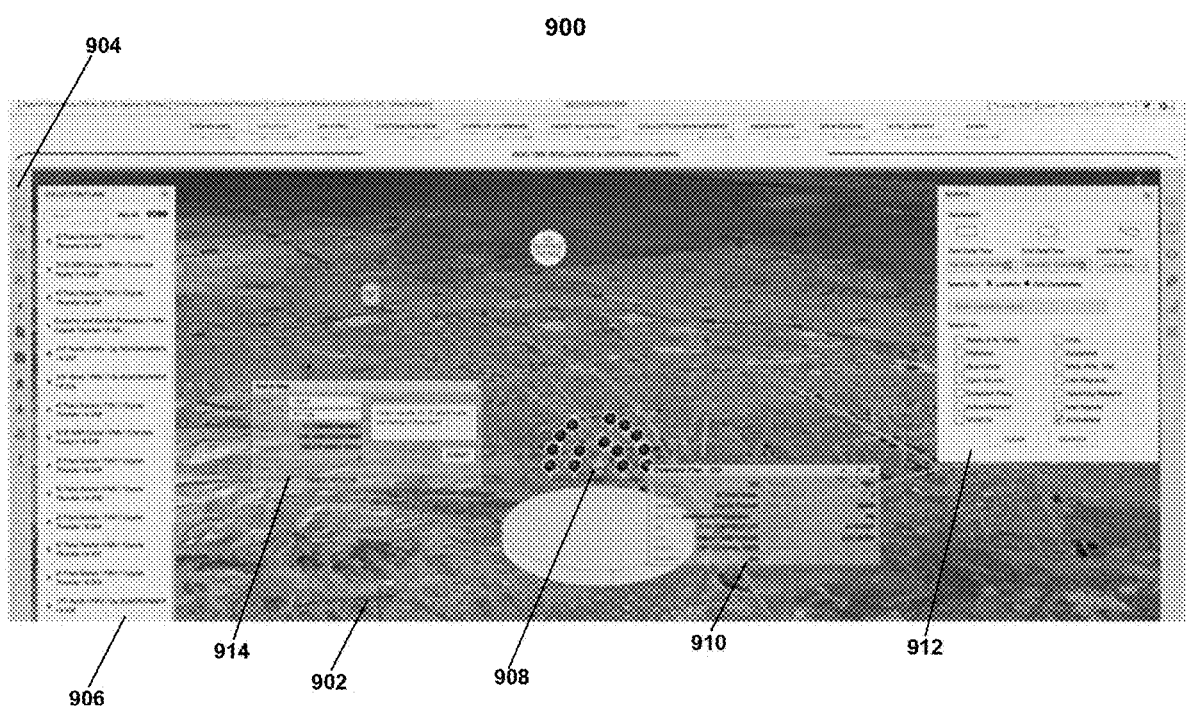
FIG. 9 depicts a screenshot of an example of a Common Operating Picture (COP) according to exemplary embodiments.

FIG. 9 depicts a screenshot 900 of a Common Operating Picture (COP). The COP is defined by a map that displays all the units, equipment, and key locations. The display may automatically display units, ISR resources, and unit information to enable users to track current operations. The COP 900 may have map portion 902, a filter toolbar 904, a mission display 906. On the map 902, bases and units may be displayed (e.g., at 908). Clicking on a base or unit, may pull up a unit information/status window 910. A search window 912 may allow a user to search the map 902. Users can add information to the map using the add to map window 914. The filter toolbar 904 may allow for straightforward one-click (on the various icons) filtering of the content displayed on the map 902.

Figure 10:
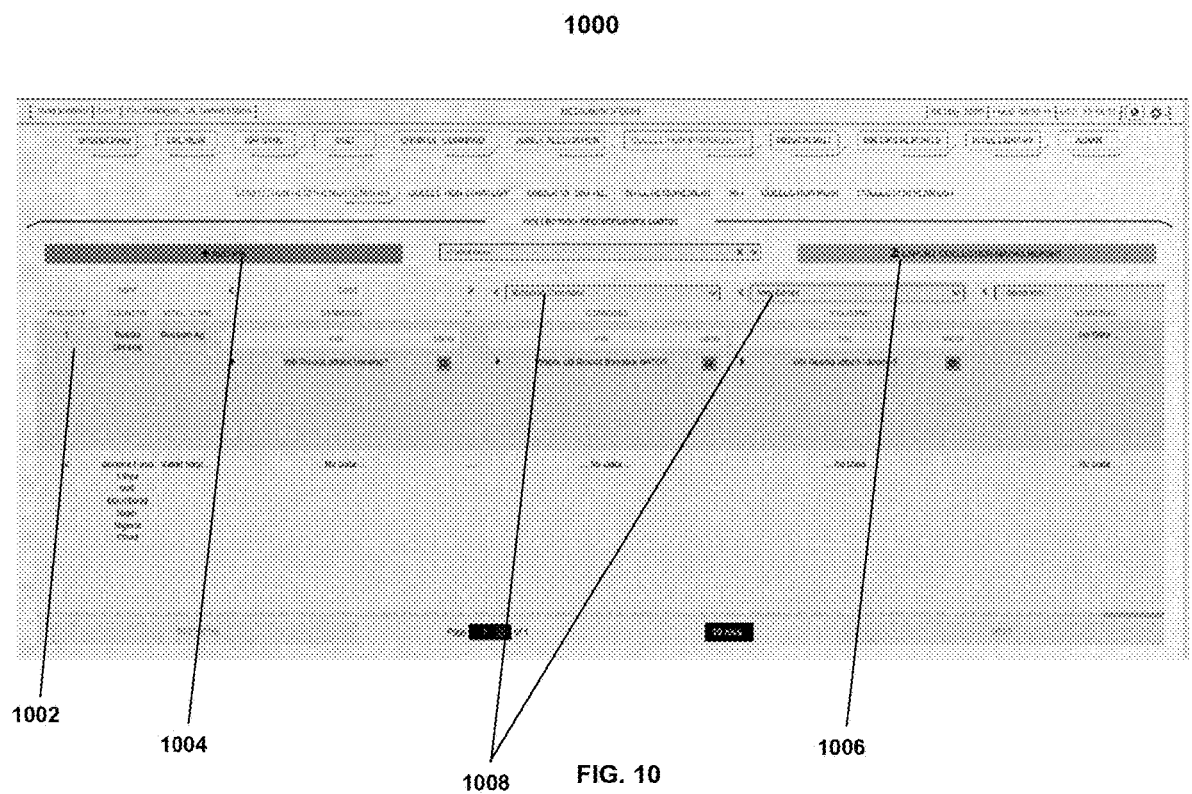
FIG. 10 depicts a screenshot of an example of linked unit Priority Intelligence Requirements according to exemplary embodiments.

FIG. 10 depicts a screenshot 1000 of linked unit priority intelligence requirements. Specifically, the screenshot displays the unit to unit synchronization from the National Intelligence Priority Framework (NIPF) to each unit's Priority Intelligence Requirements (PIR). According to exemplary embodiments, the software may support information collection requirements processes with three primary functions which include (1) Priority Intelligence Requirements Management; (2) Collection Strategy and Collection Plans Management; and (3) Requests for Information Management. The PIR can be filtered by command or region. Priority intelligence requirements 1002 may be displayed in order of priority. For example, 1002 has a priority of one.

Regarding Priority Intelligence Requirements Management, the software can provide users in units the capability to develop and manage unit level Priority Intelligence Requirements. An option 1004 may allow a user to add priority requirements to the listing. Users may have the ability to link to higher headquarters to create a synchronized effort across the chain of command.

Regarding Collection Strategy and Collection Plans Management, the software can provide users the ability to create long-term multi-phased collection plan. An option 1006 may allow export of a collection matrix report. The software may provide point-and-click user interface including multi-echelon processes up and down the chain of command as determined by the unit relationships. Users within and between units can create requests for intelligence collection and validate collection requirements. Approved collection requirements are fully integrated with the Intelligence Surveillance and Reconnaissance (ISR) Management Function of the software.

Regarding Requests for Information Management, the software can provide users the ability to create, edit, and delete requests for information. The users are able to approve and route requests automatically according to the chain of command and unit relationships.

Filters, in the form of drop down menus, like at 1008, may allow users to filter the requirements by command and/or geographic region.

Figure 11:
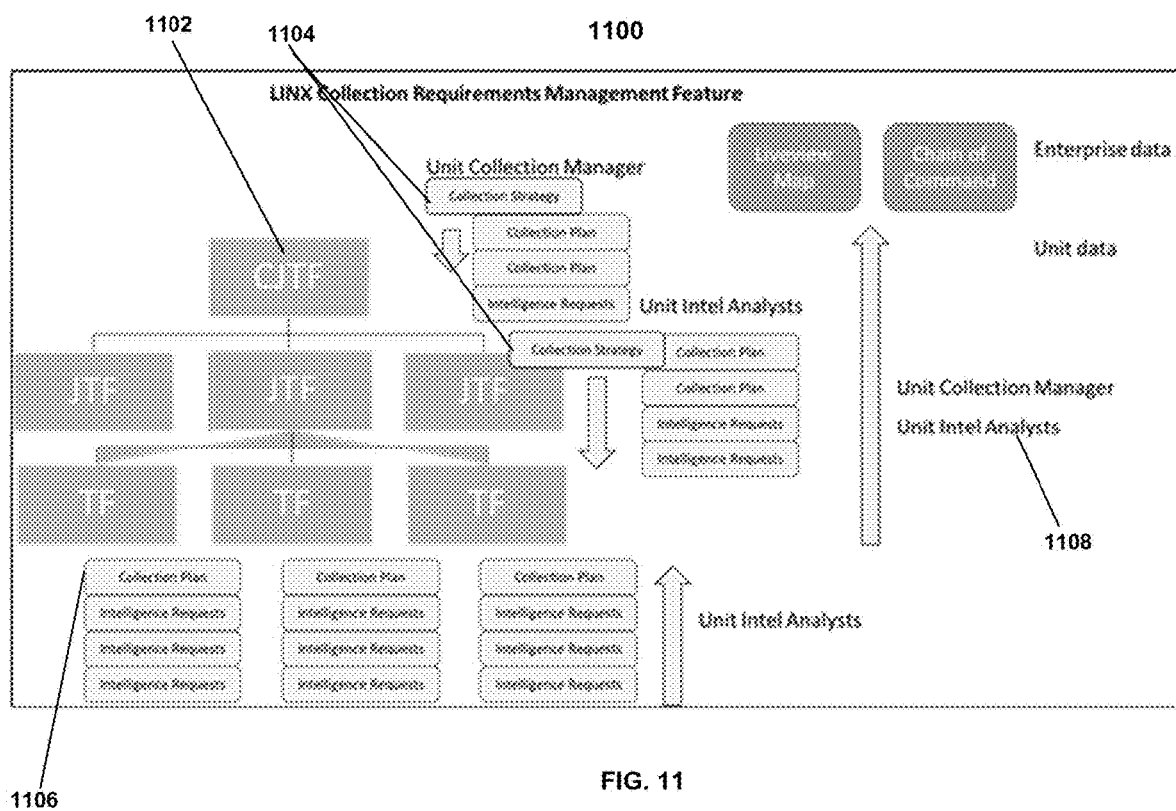
FIG. 11 depicts the Collection Requirements Management Feature according to exemplary embodiments.

FIG. 11 depicts the Collection Requirements Management Feature 1100 according to exemplary embodiments. Specifically, FIG. 11 displays the unit-to-unit relationships and process to synchronize collection plans and requests for information. Exemplary embodiments may provide the capability to allow users in different units to do this type of linkage and this shows how the unit information is not only controlled but also linked between units in the chain of command. At 1102, the unit relationships are depicted in a top down format, with the higher level command, in this case a Commander, Joint Task Force (CJTF), at the top. Below that command are Joint Task Forces (JTF) and Task Forces (TF). Collection strategies 1104, along with collection plans and intelligence requests flow downward starting with a unit collection manager at the CJTF level to unit intel analysts at each JTF. Collection plans 1106, along with intelligence requests, flow upward from the unit intel analysts at each TF unit (with only one unit plans 1106 being labeled in FIG. 11). Unit collection manager and unit intel analysts can all access Enterprise Data, such as the Liveview Map and Chain of Command, to gain situational awareness. Unit data may only be available to those users at the units and in the chain of command for the units, such as the chain of command 1102 depicted.

Figure 12:
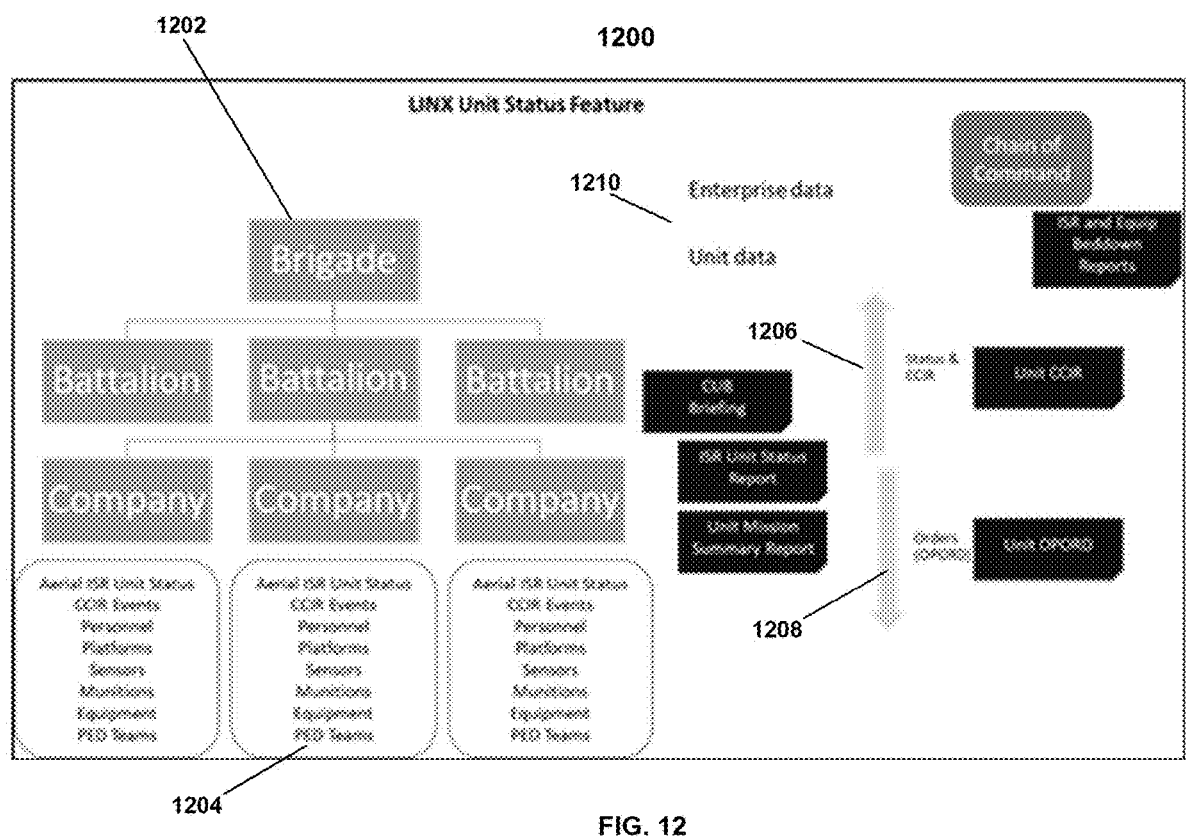
FIG. 12 depicts the chain of command and unit status relationships according to exemplary embodiments.

FIG. 12 depicts the chain of command and unit status relationships 1200 in echelon and the reporting from subordinate to higher units and direction from higher to subordinate units that follows along with what is shown in FIG. 11, except the unit levels shown would be below the TF level and at the operational unit level. The Unit Status Module may be one of two modules in the software that supports mission command and management of ISR forces (with the second being an Asset Allocation module describe below in FIG. 14). The Unit Status Module may allow units to manage unit resources, personnel, and information with reporting throughout the relevant chain of command. Specifically, the software, with this module, may allow for managing of unit resources including equipment and ISR vehicles and sensors; for managing personnel of each unit; for managing unit information, and for submitting daily unit status reports to higher headquarters to compile a complete record of ISR resources and personnel.

In FIG. 12, at 1202, the unit chain of command shown starts with Brigade at the top, then Battalions below that, and then Companies. Each Company has a set of unit status information, such as Aerial ISR Unit Status 1204, which may include COR events, personnel, platforms, sensors, munitions, equipment, and PED teams.

At 1206, unit status and Command Combat Reserve (CCR) is reported up the chain of command from the company level to the brigade level. At 1208, orders (e.g., operational orders (OPORDS) flow down from the brigade level. At 1210, the enterprise and unit data is shown and this is used with the chain of command relationship management. The enterprise data may be available to all users in the system but the unit data may be confined to the chain of command shown in FIG. 12, along with the higher level commands to which the units may be assigned (e.g., 1102 from FIG. 11). Further, in FIG. 12, the reports from FIG. 7 can be seen such as CUB briefing, ISR unit status reports, unit mission summary reports, Unit CCR reports, Unit OPORDs, and ISR/Equipment Beddown Reports. These reports, which are generated from the data as described with respect to FIG. 7, are used by the various users at the different levels of the chain of command.

Figure 13:
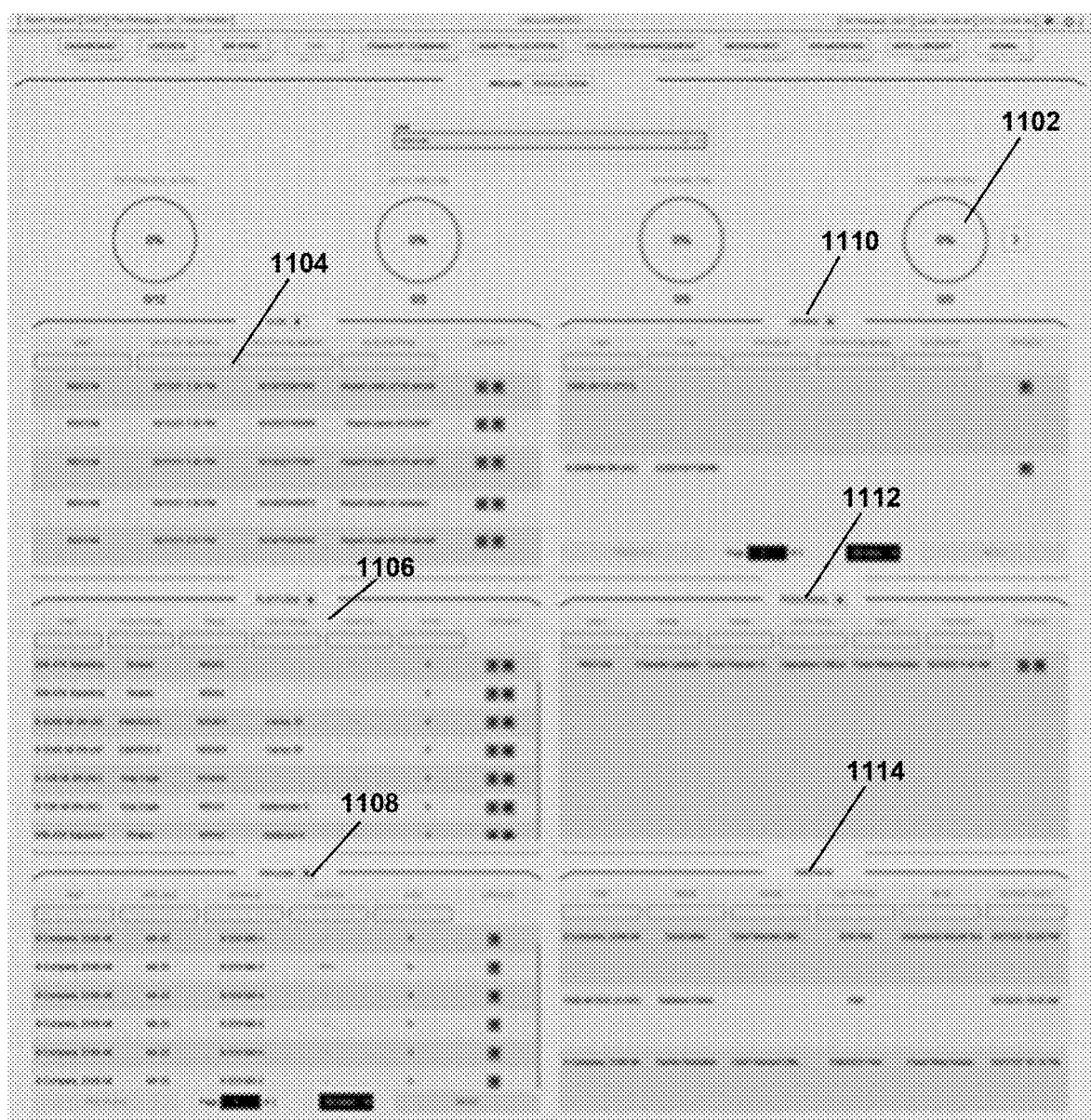
FIG. 13 depicts a screenshot of an example Unit Status page according to exemplary embodiments.

FIG. 13 depicts a screenshot of a Unit Status page 1300. This page may provide users with a list of unit personnel, resources, and information, along with the status of each item. All units have four primary panels for: (1) personnel in the unit, (2) to create reports of unit performance, (3) plans for tactical military operations, and (4) a list of operational orders pertaining to the unit. The page automatically displays panels for resources assigned to each unit: aircraft, intelligence sensors, critical equipment, munitions, and unit teams. Users can adjust status of each item. The page automatically displays unit information such as the Commander's Critical Information Requirements (COIR), Priority Intelligence Requirements (PIR), and operations.

At 1102, a list of subordinate units is provided with the status of each unit. The information displayed may be toggled to represent information and status associated with ah particular subordinate unit. At 1104, a list of unit Commander's Critical Information Requirements (CCIR) is provided. Updates can be made to reflect current event status. At 1106, a list of unit aircraft is provided with operational status, location, and maintenance plans. The aircraft may be ISR platforms. In some embodiments, this listing of aircraft may be replaced with ground ISR platforms or maritime ISR platforms or other tactical platforms (as a non-exhaustive listing) depending on the unit type. Updates can be made to the various information fields. At 1108, a list of equipment required to operate the ISR platforms is provided. The status of this equipment can be updated. At 1110, a list of operational orders (OPORDS) to subordinate units is displayed. A listing of reports to generate information on unit status and operational missions may be provided also. At 1112, a list of personnel assigned to the unit is displayed along with the status of those personnel. Personnel status may be updated. At 1114, a list of special teams, pilots, intelligence teams and ground operating teams may be provided along with the status of such. The status may be updated.

Figure 14:
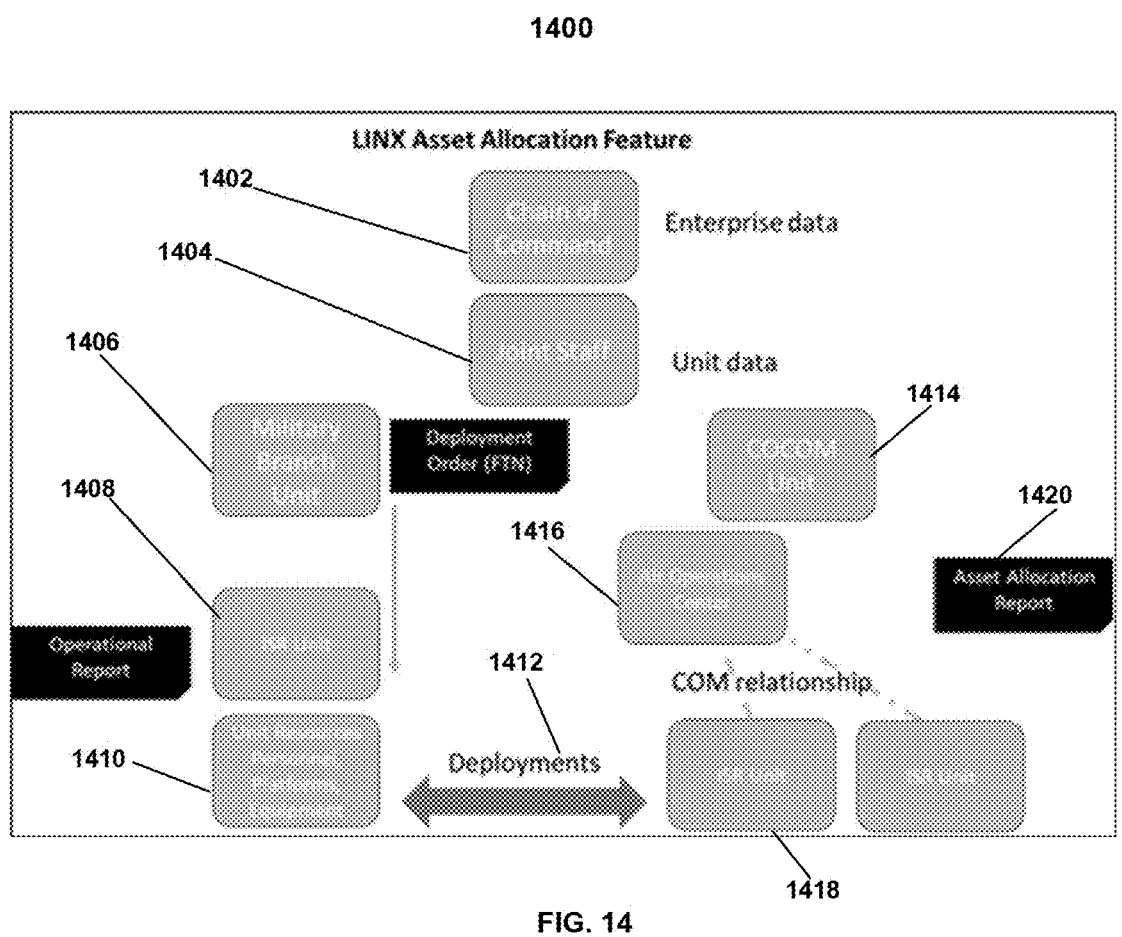
FIG. 14 depicts the Asset Allocation Module according to exemplary embodiments.

FIG. 14 depicts the Asset Allocation Module 1400. This module may allow users to manage resources between unit and provide direction on mission allocation of ISR resources, as well as monitoring mission execution. Users can adjust the status of resources and personnel. Asset allocation is based on the chain of command and the unit relationships within the chain of command. The chain of command 1402 may have access to enterprise data; that is, data that all users of the program can view, and thus, the entire chain of command can access all enterprise data. The joint staff 1404 may have access to unit data on various units, such as military branch units 1406. Deployment orders may be issued to a military branch unit, such as an ISR unit 1408. ISR units 1048 can generate operational reports for the chain of command. Each unit 1408 may have unit resources 1410 such as personnel, platforms and equipment. Units, such as 1408, may be deployed (1412) to Combat Commands (COCOM) (COCOM Units) 1414. The COCOM may have an air operations center 1416 that provides operational command and control of the deployed ISR units (1418), such as, for example, issuing Air Tasking Orders for missions using the program as described herein. Asset allocation reports may be generated (1420) to provide the COCOM a view of what is happening.

Exemplary embodiments thus allow for higher level commands (such as joint staff 1404) to manage units that are part of the various military branches (1406). Each military branch can manage and allocate its units. Once deployed, the responsible commander, such as a COCOM 1414 can manage and allocate its deployed units 1418. The program may automatically generate reports such as operational reports and asset allocation reports that are then available to users of the program within the chain of command. As units are deployed, that units chain of command may automatically change within the program based on the deployed unit's status and location. The change in chain of command ensures that the proper commands have access to information regarding that unit and that unit has access to the proper command structure. The program allows a unit to view its chain of command so it will be aware of its assignment. Further, a unit may manually update its chain of command if required.

Figure 15:
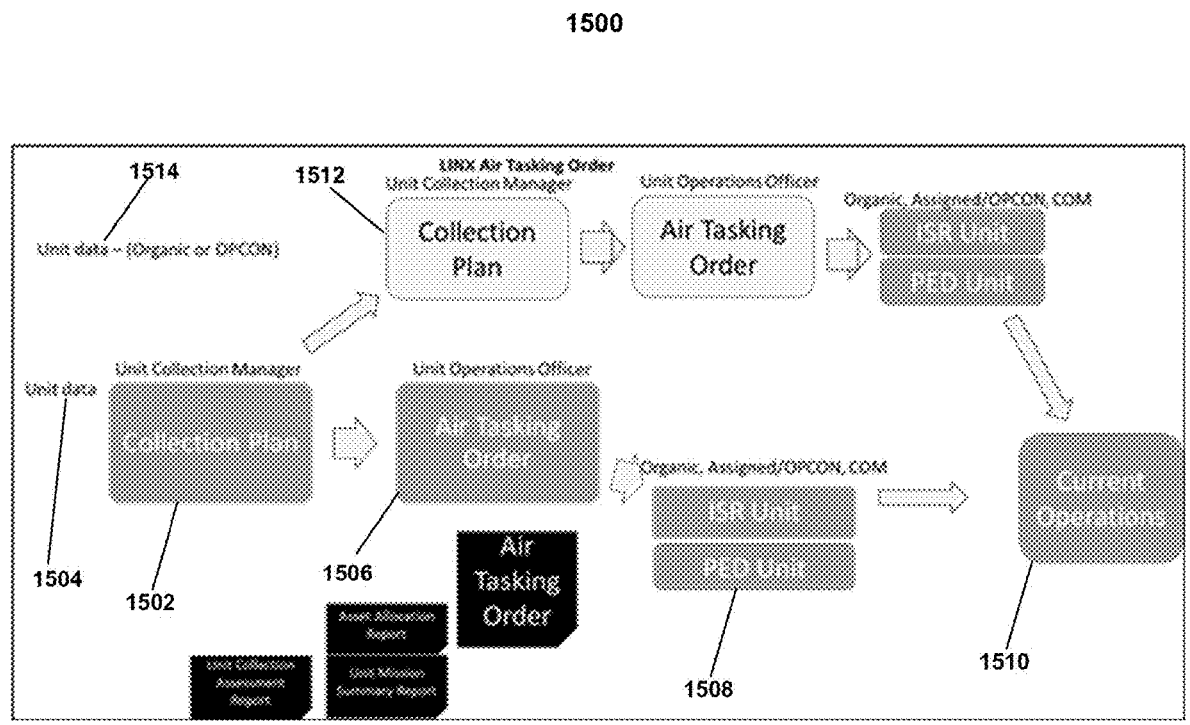
FIG. 15 depicts the Air ISR Planning Module according to exemplary embodiments.

FIG. 15 depicts the Air ISR Planning Module 1500. This module may be part of the Mission Management Module that supports mission command for units to plan and execute ISR operations. With the AIR ISR Planning Module 1500, the software may support a three-part air ISR mission command planning process having full integration between units to task aerial ISR resources to meet collection requirements and track decisions by multiple tasked units. The three part process may include: (1) Air Tasking that supports users tasking aerial ISR aircraft to meet collection requirements; (2) Air ISR Unit Plans that supports mission command decisions by air ISR units to assign aircraft and personnel to tasked missions; and (3) Intelligence Unit Plans that support mission command decisions by intelligence units to assign Processing, Exploitation, and Dissemination (PED) teams. Specifically, the screenshot 1500 depicts the aerial ISR planning sequence between units. Each unit in the chain of command has the ability to make decisions and plan and execute ISR operations. Exemplary embodiments provide users with a unique interface and information based on the unit's relationships to other units.

At 1502, a unit collection manager may develop a collection plan. To develop that plan the unit collection manager may use unit data 1504, available in the program. From this collection plan, an Air Tasking Order (ATO) 1506 may be produced by a unit operations officer. The ATO may task organic or assigned/operational control or command units 1508 to perform a mission in support of the collection plan. At 1510, the units tasked may perform the mission as part of a current operation.

In FIG. 15, there is a parallel sequence shown, but it goes from a collection plan 1512 developed from the collection plan 1502. This may be a case where the collection plan 1502 is developed at a higher level, such as a CJTF and is sent to a lower level, such as a JTF for execution and that level tailors the plan to its own unit data (e.g., organic or operational control (OPCON) 1514). The sequence of events is the same after that as depicted in FIG. 15. In general, orders from higher level commands to lower level commands and reports flow up the chain of command.

Figure 16:
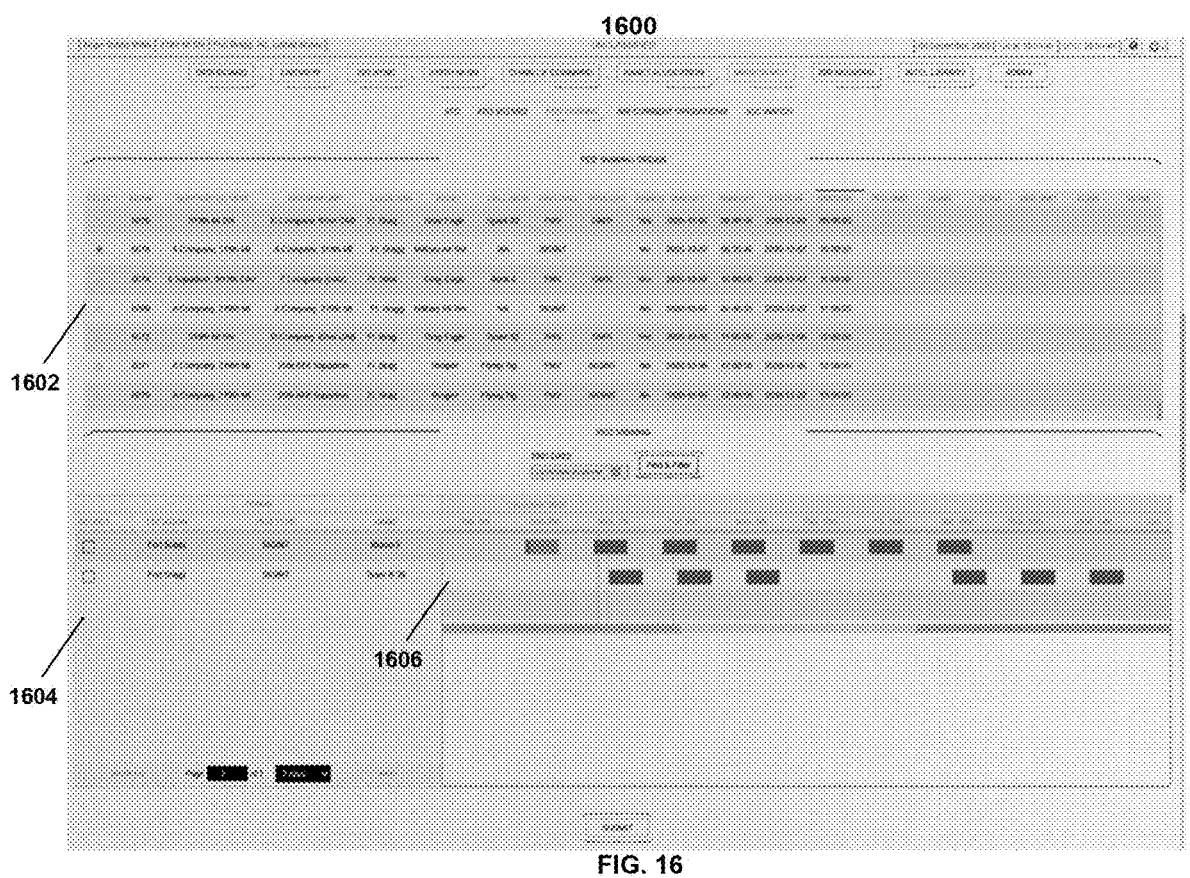
FIG. 16 depicts a screenshot from the program's ISR Mission Management process according to exemplary embodiments.

FIG. 16 depicts a screenshot 1600 from the program's ISR Mission Management process. The screenshot displays the user interface to create the Processing, Exploitation, and Dissemination (PED) Tasking Order. The top part of the page 1602 shows the list of ISR missions, and the bottom part of the page 1604 displays the PED teams within the unit's chain of command. The user can make decisions for which PED team(s) will support each mission by selecting a team or individual that is available during the mission as shown on the timeline portion 1606. This step may be done after missions are tasked (e.g., via an ATO).

The Mission Management Module may further include a Ground ISR Planning Module that supports users creating ground ISR missions. Specifically, the software may include a resources and information requests feature to allow for supporting user decisions on selecting resources from specific unit and/or combing resources from multiple units and supporting requests from ground ISR user to create information requests, respectively. This module may include similar functionality to that shown for the Air ISR Planning Module 1500 in FIG. 15 above.

The Mission Management Module may further include a Current ISR Operations Module. Specifically, this module may support mission command decisions for current ISR operations and have full integration between ground and air ISR forces. The module may include mission command to support user decisions regarding ground and air ISR forces and allow for the ability to redirect missions based on changing conditions. The module may further include ground ISR mission tracking to support ground ISR mission unit decisions and reports to monitor ground ISR forces. Similarly, the module may include air ISR mission tracking to support air ISR mission unit decisions and reports to monitor and track air ISR forces. Lastly, the module may support Intelligence (PED) Team Tracking of multiple Intelligence PED teams to conduct near-real time information reporting.

Figure 17:
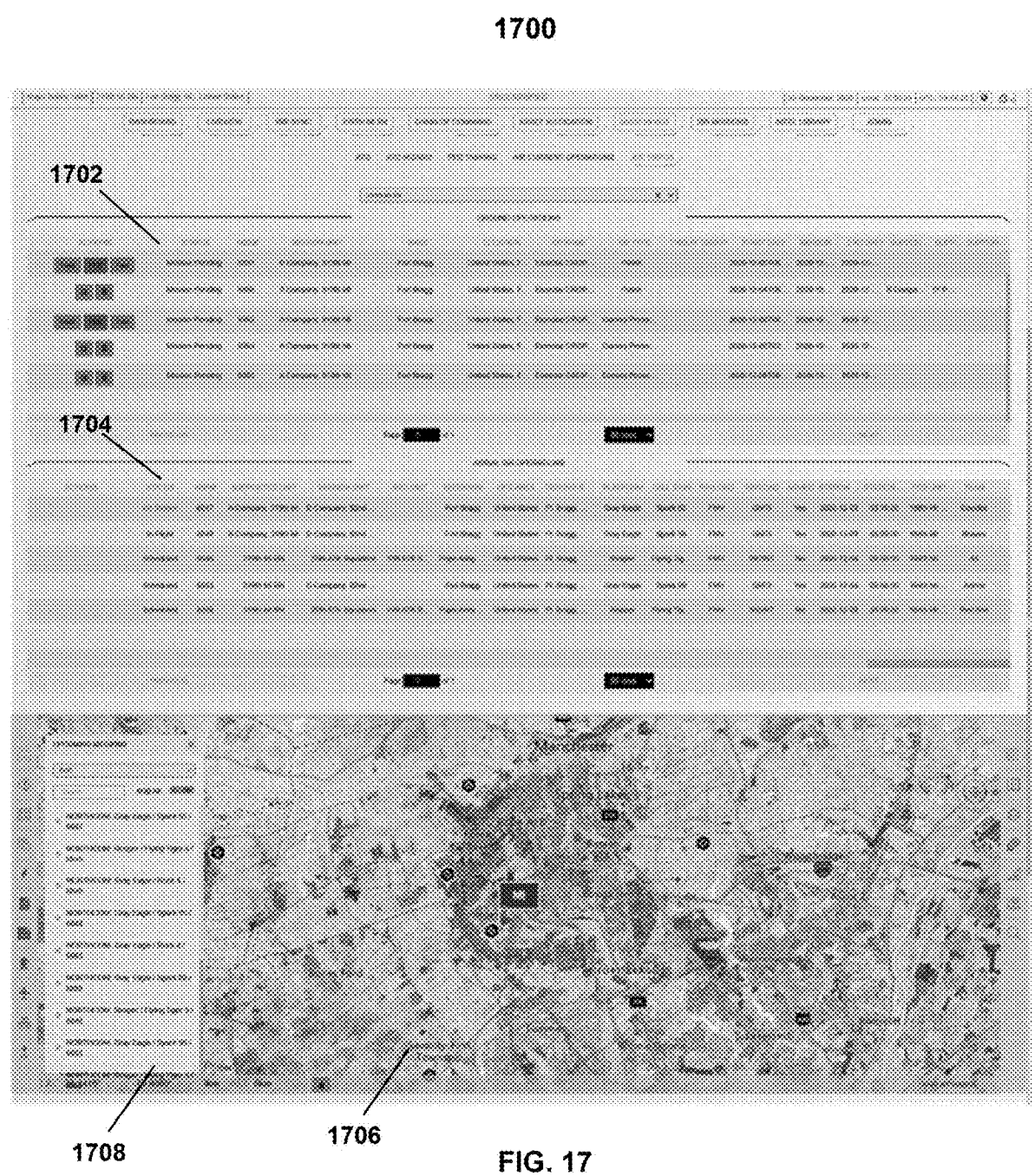
FIG. 17 depicts a screenshot of the Joint Operations Center (JOC) Watch user interface according to exemplary embodiments.

FIG. 17 depicts a screenshot 1700 of the Joint Operations Center (JOC) Watch user interface that allows for mission command of ground and air ISR forces. This screenshot may be part of the Mission Management Module described above. The JOC Watch interface may display the ground and air ISR missions to each user defined by the unit's relationships in the chain of command. The display of both ground and air ISR information on one page is unique to exemplary embodiments. As shown in FIG. 17, the display may include a listing of ground operations 1702 and a listing of air operations 1704. Information above each mission may include, but not be limited to, actions, status, mission number, mission unit, base, location, operation type, call sign, start date/time, end date/time, supported unit, PED unit assigned, payload, tasking command, operational area.

A map display 1706 may be provided to display information regarding the operations. The map display may have a window listing upcoming missions 1708, which includes all missions, such as air and ground.

Referring to the preceding screenshots, an explanation of operation of the software and how a user may use it will now be provided. According to exemplary embodiments, the Chain of Command (e.g., as depicted in FIG. 8) forms the basis of the software and is a unique feature. The hierarchy of the chain of command flows through the software and determines, in certain instances, what a user has access to and the options presented. For example, a user in one geographic commander cannot task or assign assets belonging to another geographic commander. The Chain of Command screen provides a visual representation of the chain of command across the board for all participating services and commands. Relationships and unit assignments can be created and modified by users, without the need to an administrator or software developer. A units chain of command assignment may be automatically updated based on the unit's deployment schedule and actual location. For example, a unit while in Europe may be part of EUCOM but once the unit moves to the Middle East, the unit's assignment may be updated to CENTCOM. Further, the Chain of Command screen provides asset information at each commander and level, which is viewable by all users. According to exemplary embodiments, user can only see or access what is appropriate or available to them. For example, a user in EUCOM would have access to units assigned that command which would differ from what a user in CENTCOM or AFRICOM would see in the software.

A second key feature is the Common Operating Picture or COP (e.g., as depicted in FIG. 9). The COP is automatically generated by the software and is visible to all users. The COP provides a fusion of information from the software to provide situational awareness. Filters and search tools enable a user to focus on a certain set of assets or geographic region. Users can view real-time data on unit locations and operations. In exemplary embodiments, using a Liveview feature, FMV can be viewed. In other embodiments, signals, radar, and other sensor information may be viewed. Because all users have access to, a user in one area can see what assets another area has so that user is aware of what may be available in the event a need arises.

Using the software, a user may order deployment of an asset from location A to location B and designate what chain of command the unit will report to. This is part of asset allocation. Next, a user may establish collection requirements to support an operation or mission (e.g. using the display of FIG. 10 and flow of FIG. 11). The software provides unit status information to assist in planning. A catalog of unit data is populated by users and is available to support planning and also provides inputs for planning based on unit capabilities (e.g. FIGS. 12 and 13). Once requirements are established, assets can be allocated to support the requirements and then tasked (e.g., generation of an ATO or OPORD) (e.g., FIGS. 14 and 15) by operations user. Once the assets are tasked, the order can be linked/sent to the appropriate level command for approval. Finally, analysts or PED teams can be assigned to monitor the mission and process the received sensor data (e.g., using the display of FIG. 16). The JOC watch display (e.g., FIG. 17) may provide an interface for real-time command and control of assets.

Additionally, upon a user logging in with validated credentials they are assigned those roles. The user interface only displays the appropriate pages based upon roles assigned. The format of data going between the client and server is based using JSON and HTML Form Data if files are required as input. It is authenticated using Json Web Tokens as a security method to ensure communications are secured through an HTTPS environment. For example, when a user logs in, that user will see information and orders that are for them. Thus, when a unit is tasked with a mission, users in that unit will see that tasking when they log into the software. When a user is entering information or selecting options, only appropriate options are available for that user and its associated unit, thus ensuring that inappropriate assignments or missions are not selected.

Multiple servers are in use to provide redundancy and scalability. In some instances, the web server is cloned to handle more requests of incoming user requests. This is conjoined with multiple SQL databases that are synced together to allow for faster responses. Additionally, this methodology is used for redundancy if a particular instance is needed for upgrades or has failed, the system may still operate as intended. In other instances, the video digesters are scaled. In general, video digestion is expensive in CPU/GPU computations and multiple video sources being digested on a single system will eventually lead to failure with a certain amount of video streams. To mitigate this, multiple instances are created on demand to start digesting each feed. As each ingestion of a video may take more or less resources than another, the orchestrator of sending a command for a server to start digesting a video is based upon current CPU and RAM availability.

The foregoing examples show the various embodiments in exemplary configurations; however, it should be appreciated that the various components may be configured in a variety of ways. Further, it should be appreciated that the components of the various embodiments may be combined into one or more devices, collocated on a particular node of a distributed network, or distributed at various locations in a network, including being geographically separated, for example. As will be appreciated by those skilled in the art, the components of the various embodiments may be arranged at any location or locations within a distributed network without affecting the operation of the respective system.

As described above, the various embodiments support a number of devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, application, or software.

The foregoing examples show the various embodiments in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation the various embodiments may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments. For example, the programming language used may include assembly language, Ada, APL, Basic, C, C++, COBOL, dBase, Forth, Fortran, Java, Modula-2, Pascal, Prolog, REXX, Visual Basic, and/or JavaScript. Further, it is not necessary that a single type of instructions or single programming language be utilized in conjunction with the operation of the system and method of the various embodiments. Rather, any number of different programming languages may be utilized as is necessary or desirable.

Also, the instructions and/or data used in the practice of various embodiments may utilize any compression or encryption technique or algorithm, as may be desired. An encryption module might be used to encrypt data. Further, files or other data may be decrypted using a suitable decryption module, for example.

In the system and method of exemplary embodiments, a variety of "user interfaces" may be utilized to allow a user to interface the systems described in the various embodiments. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

It will be readily understood by those persons skilled in the art that the various embodiments are susceptible to broad utility and application. Many embodiments and adaptations other than those herein described, as well as many variations, modifications and equivalent arrangements, will be apparent from or reasonably suggested by the various embodiments and foregoing description thereof, without departing from the substance or scope of the various embodiments.

Accordingly, while the various embodiments have been described here in detail in relation to its exemplary embodiments, it is to be understood that this disclosure is only illustrative and exemplary of the various embodiments and is made to provide an enabling disclosure of the various embodiments. Accordingly, the foregoing disclosure is not intended to be construed or to limit the various embodiments or otherwise to exclude any other such embodiments, adaptations, variations, modifications or equivalent arrangements.

Although the embodiments have been described herein in the context of a particular implementation in a particular environment for a particular purpose, those skilled in the art will recognize that its usefulness is not limited thereto and that the embodiments can be beneficially implemented in other related environments for similar purposes.

The attached Appendix provides additional description of exemplary embodiments. The Appendix contents are incorporated by reference herein.

What is claimed is:

1. A system, comprising:
two or more servers, each server comprising at least one processor and computer memory and hosting an open architecture environment that comprises a Model View Controller (MVC) scheme comprising layers of separation between each server and connected clients as well as one or more Application Programing Interfaces (APIs) configured as asynchronous tasks, wherein each server provides a specific functionality and is interconnected to provide a networked capability, and each server is modularly configured comprising a capability to be added or removed from the system without impacting operation of the system, and being configured to:
receive data from one or more external sources as multiple data streams, wherein the received data comprises Intelligence, Surveillance, and Reconnaissance (ISR) operations data comprises multiple different classifications levels comprising at least top secret, secret, and unclassified;
process the received data, the processing comprising geoprocessing to provide maps and layers relevant to the received data;
normalize the received data, the normalizing comprising transforming the received data into one or more standard formats;
store the normalized data in at least one repository;
apply artificial intelligence and machine learning algorithms to the normalized data following storing the normalized data; and
utilize an interactive interface to dynamically display the normalized data to one or more end users, the interactive interface comprising a real-time dashboard generated by automated data feeds, a common operating picture, a graphical display of a chain of command relating to military forces, an organization and team management interface; and a hierarchical status and readiness reporting portion, wherein each end user is assigned a specific role defining a level of interaction with the system and that specific role is determined by each end user's position in the chain of command and is automatically updated by on each end user's assignment in the chain of command and location and wherein the common operating picture displays, in real-time to all users of the system, a worldwide status of a plurality of units including providing a live view, comprising at least full motion video from sensors associated with one or more units during mission execution.

2. The system of claim 1, further comprising each server being configured to support multilingual collaboration.

3. The system of claim 1, wherein the hosting environment of each server is platform agnostic.

4. The system of claim 1, wherein each of the two or more servers are hosted in geographically separate locations.

5. The system of claim 1, wherein the geoprocessing is served by an open source software server comprising Post-GIS and imagery file repositories.

6. A system, comprising:
two or more servers, each server comprising at least one processor and computer memory and hosting an open architecture environment that comprises a Model View Controller (MVC) scheme comprising layers of separation between each server and connected clients as well as one or more Application Programing Interfaces (APIs) configured as asynchronous tasks, wherein each server provides a specific functionality and is interconnected to provide a networked capability, and each server is modularly configured comprising a capability to be added or removed from the system without impacting operation of the system, and being configured to:
receive and process data from one or more external sources as multiple data streams, wherein the received data comprises Intelligence, Surveillance, and Reconnaissance (ISR) operations data comprising multiple different classifications levels comprising at least top secret, secret, and unclassified;
normalize the received data, the normalizing comprising transforming the received data into one or more standard formats;
store the normalized data in at least one repository;
apply artificial intelligence and machine learning algorithms to the normalized data following storing the normalized data;
utilize an interactive interface to dynamically display, the normalized data to one or more end users, the interactive interface comprising a real-time dashboard generated by automated data feeds, a common operating picture, an organization and team management interface; a graphical display of a chain of command relating to military forces, and a hierarchical status and readiness reporting portion, wherein each end user is assigned a specific role defining a level of interaction with the system and the common operating picture is available to all end users, wherein the chain of command comprises a plurality of individual commands and the chain of command automatically determines what each end user has access to and options presented to each end user based on a position of each end user in the chain of command and is automatically updated based on each end user's assignment and location,
wherein the common operating picture displays, in real-time to all users of the system, a worldwide status of a plurality of units including providing a live view, comprising at least full motion video from sensors associated with one or more units during mission execution;
provide tailored information and options to each end user based on a position within the chain of command and operational tasking requirements generated by other users at higher levels in the chain of command, each end user being associated with one or more units comprising at least one of air or ground Intelligence Surveillance and Reconnaissance (ISR) assets;
accept input of information from each user regarding its associated one or more units, wherein the input of information comprises unit status and mission capability; and
accept input from one or more users to update a position within the chain of command.

7. The system of claim 6, wherein the processing of the received data comprises geoprocessing to provide maps and layers relevant to the received data.

8. The system of claim 6, wherein the ISR operations data comprises one or more of air and ground ISR data.

9. The system of claim 8, wherein the ISR operations data comprises full motion video.

* * * * *